Nov. 29, 1966 M. LENT 3,289,207
AUTOMATIC RADIO NAVIGATION AND DISPLAY UNIT DEVICE
Filed July 18, 1963 10 Sheets-Sheet 1

INVENTOR.
MARTIN LENT
BY
Jacob L. Kollin
ATTORNEY

Nov. 29, 1966 M. LENT 3,289,207
AUTOMATIC RADIO NAVIGATION AND DISPLAY UNIT DEVICE
Filed July 18, 1963 10 Sheets-Sheet 2
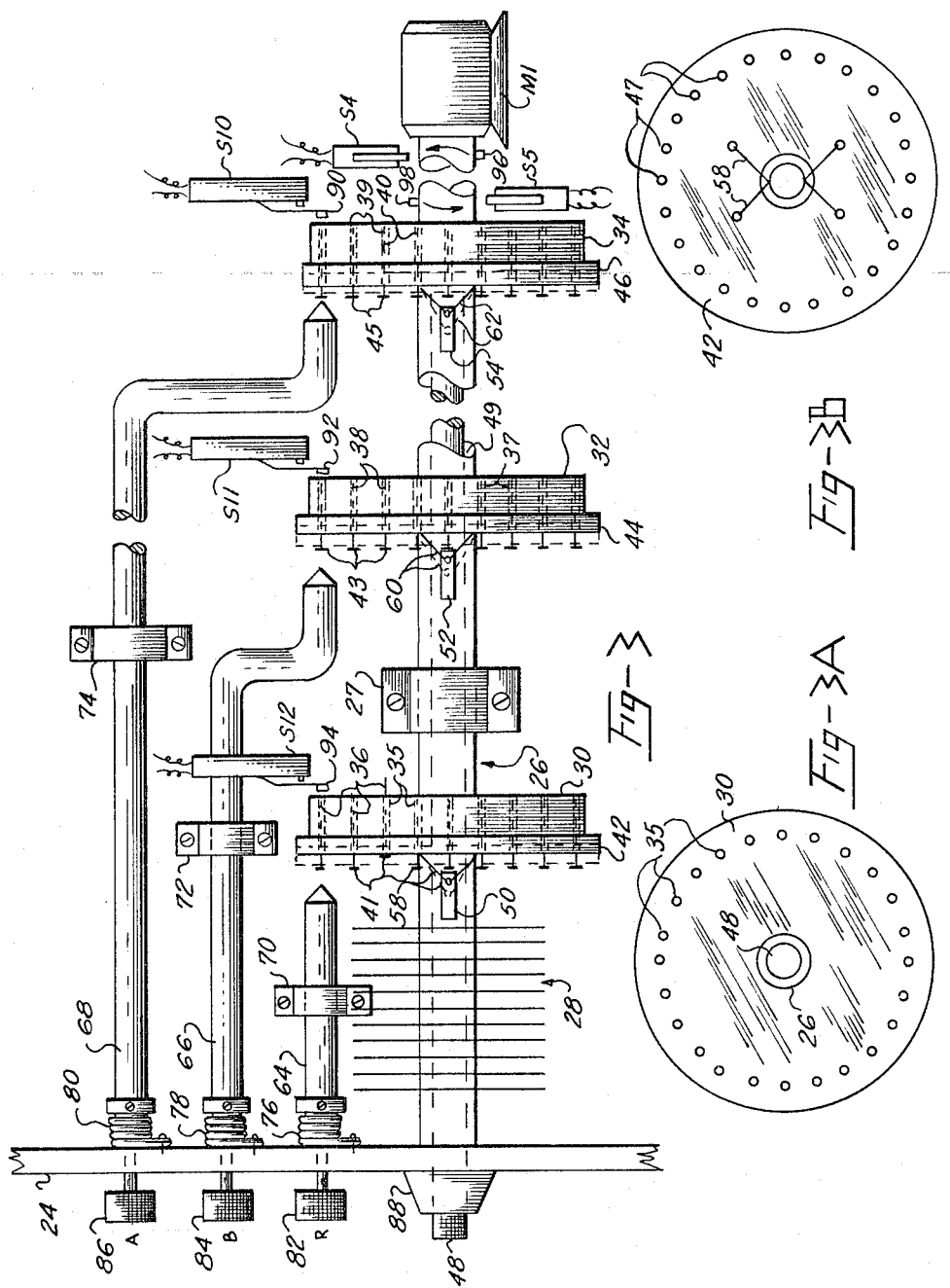
INVENTOR.
MARTIN LENT
BY Jacob L. Kollin
ATTORNEY Nov. 29, 1966    M. LENT    3,289,207
AUTOMATIC RADIO NAVIGATION AND DISPLAY UNIT DEVICE
Filed July 18, 1963    10 Sheets-Sheet 3
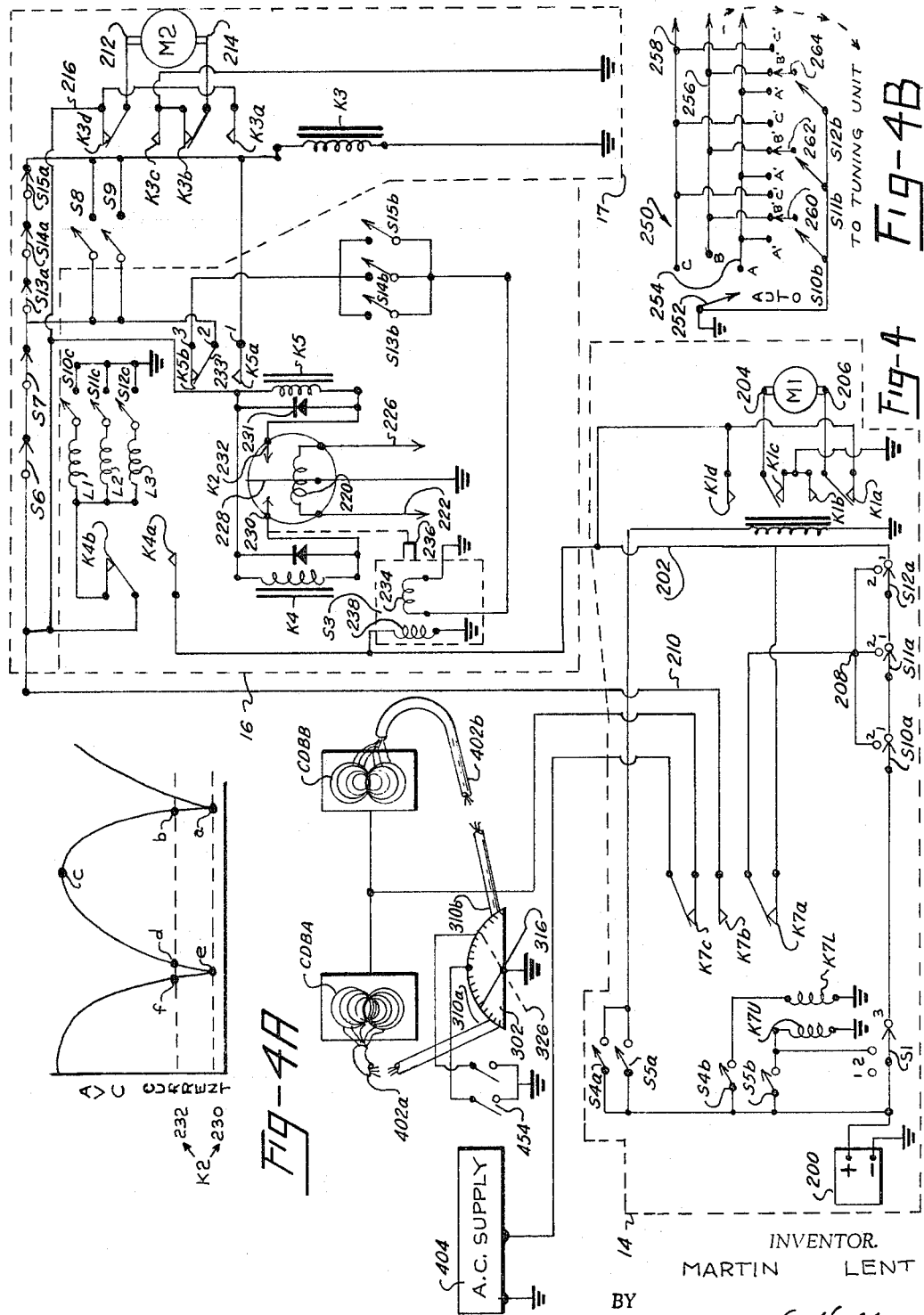
INVENTOR.
MARTIN LENT
BY Jacob L. Kollin
ATTORNEY Nov. 29, 1966

M. LENT 3,289,207

AUTOMATIC RADIO NAVIGATION AND DISPLAY UNIT DEVICE

Filed July 18, 1963

INVENTOR.
MARTIN LENT
BY
Jacob L. Kollin
ATTORNEY

Nov. 29, 1966 M. LENT 3,289,207
AUTOMATIC RADIO NAVIGATION AND DISPLAY UNIT DEVICE
Filed July 18, 1963 10 Sheets-Sheet 5
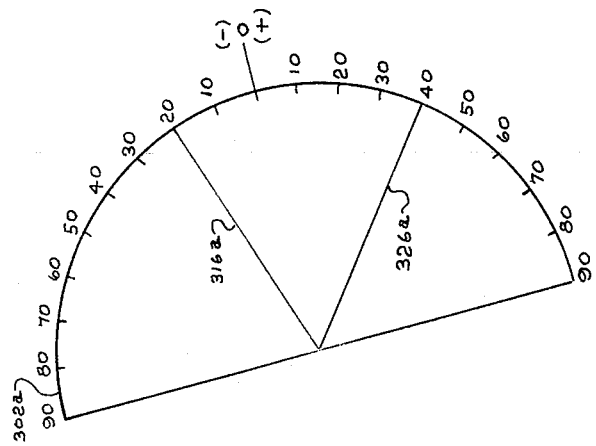
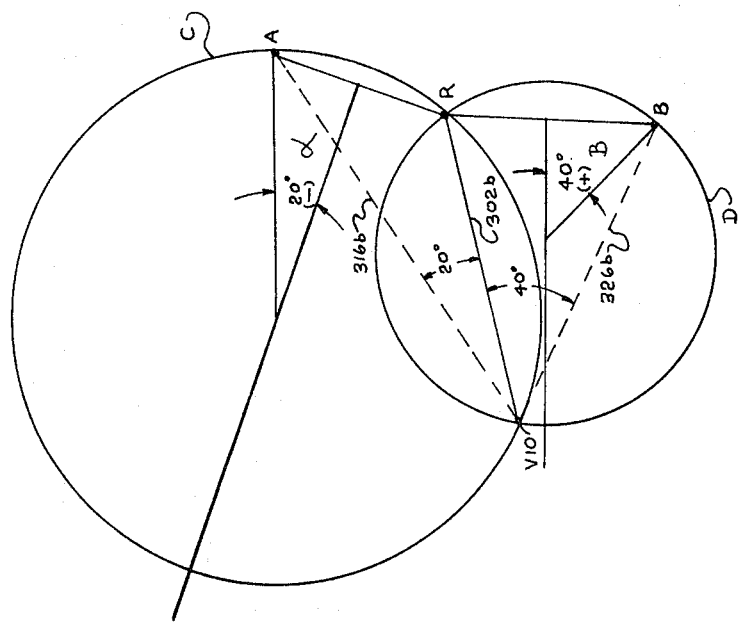
Fig-9
INVENTOR.
MARTIN LENT
BY
Jacob L. Kallen
ATTORNEY Nov. 29, 1966 M. LENT 3,289,207
AUTOMATIC RADIO NAVIGATION AND DISPLAY UNIT DEVICE
Filed July 18, 1963 10 Sheets-Sheet 8

INVENTOR.
MARTIN LENT
BY
Jacob G. Kollen
ATTORNEY

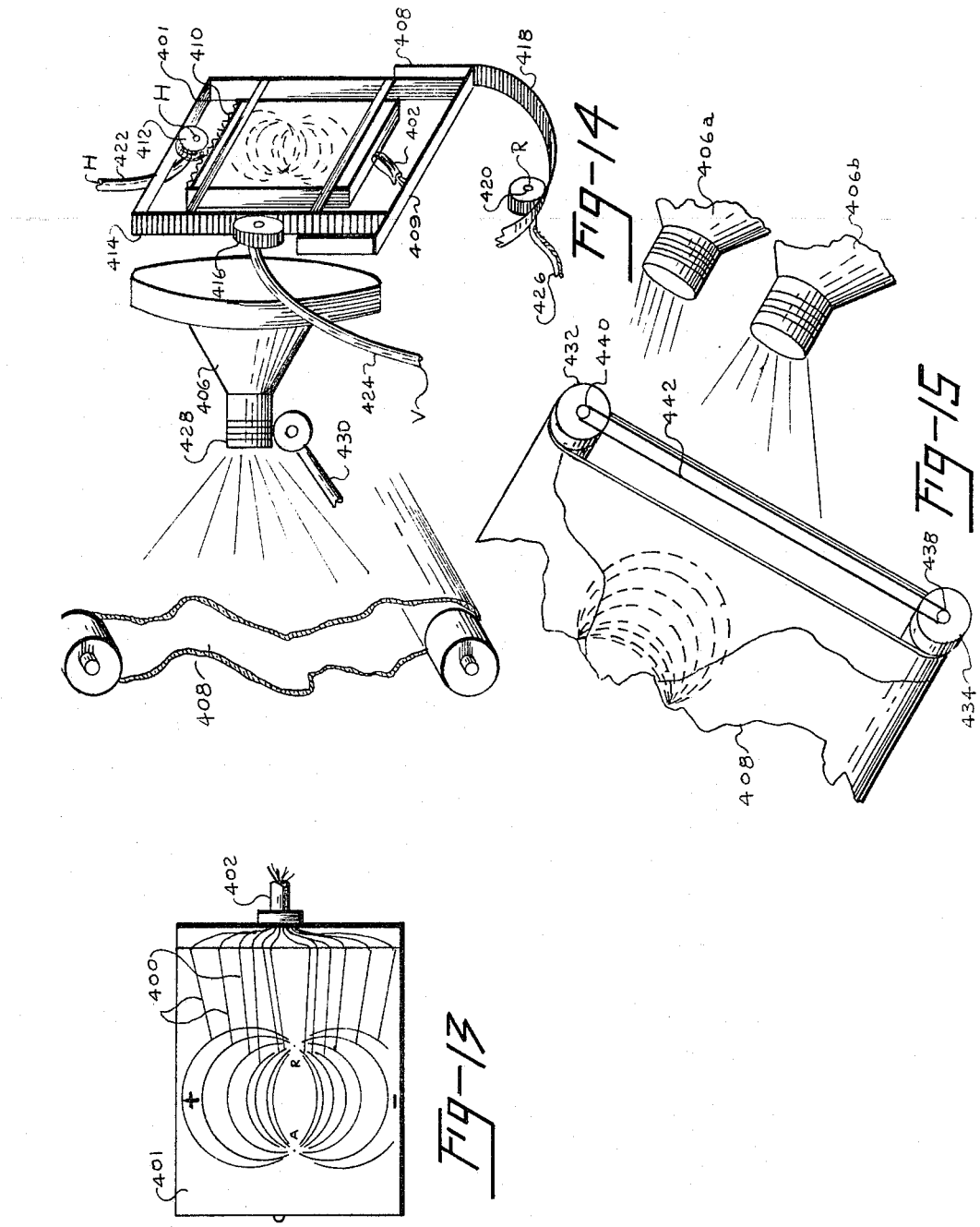

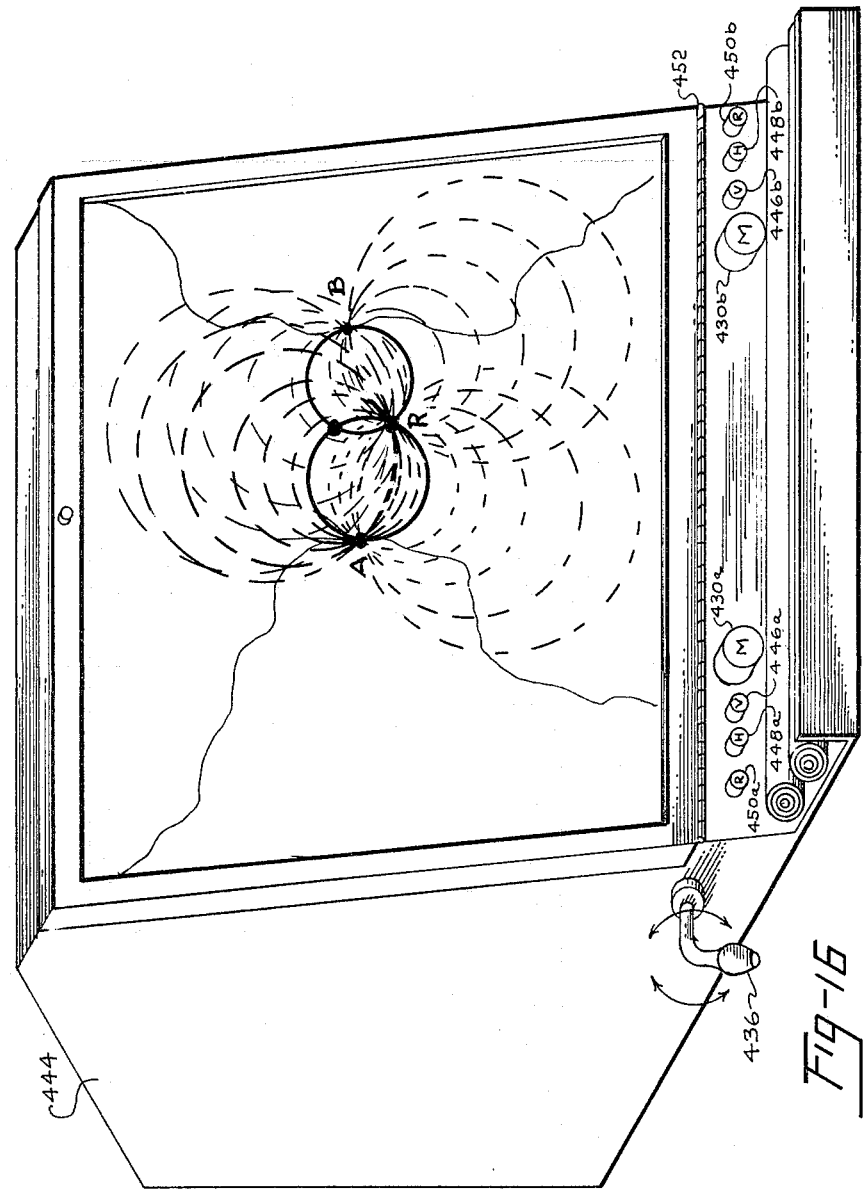

United States Patent Office 3,289,207
Patented Nov. 29, 1966

3,289,207
AUTOMATIC RADIO NAVIGATION AND
DISPLAY UNIT DEVICE
Martin Lent, 14 Sandalwood Ave., Valley Stream, N.Y.
Filed July 18, 1963, Ser. No. 295,910
50 Claims. (Cl. 343—112)

This invention relates to radio navigation systems, and more particularly to a new system for utilizing radiating, electromagnetic signals to automatically determine the position of a mobile vehicle and further to automatically indicate such position in the form of a moving indicia on chart position indicating apparatus.

Navigation systems for aircraft or marine use generally utilize several special purpose transmitters which radiate unique signals adapted for use only in conjunction with special purpose radio receivers. Such systems usually require that a separate fix be taken on each transmitting station to determine its azimuth position with respect to the vehicle whose position is being determined, and further require considerable complex accessory equipment in order to accurately determine position, such as electronic or magnetic compasses, speed indicators, and distance measuring devices. When it is desired to translate distance and bearing information automatically into polar coordinates to facilitate chart plotting, elaborate sine-cosine converters and associated servo equipment are generally employed. The data is then plotted on specially prepared maps with deliberately distorted characteristics as required by the plotting equipment.

It is therefore an object of the invention to provide a radio navigation system which requires no special transmitters or unique signals or specially adapted radio receivers but operates on ordinary broadcast or marine band signals.

It is yet another object of the invention to provide a radio navigation system having means for translating detected angular position information of a selected vehicle with respect to a plurality of transmitting stations, into circular coordinate information, which information does not require correction for ambiguous bearing determination and which information is utilized to plot automatically the continuously changing position of a moving vehicle on a selected area chart.

It is a further object of the invention to provide a vehicle radio navigation system which has an automatic and continuously moving display of a vehicle's position on a selected area chart, and which utilizes a single receiver and rotatable antenna to determine all necessary position information.

It is still another object of the invention to provide a radio navigation system which does not require that a plurality of seperate, time consuming azimuth fixes be taken on each reference transmitting station, but rapidly and automatically determines in sequence the angular position of each selected transmitting station, with respect to the position of the vehicle whose position is being determined.

In accordance with the broad aspects of the invention, means are provided for causing a rotatable directional antenna to scan an area in which an associated vehicle is located. Automatic nulling means are provided which actuate angular bearing information storage means automatically whenever the direction of each of three selected transmitting stations in the area of interest is detected by the scanning directional antenna. Translating means are also provided which translate the stored angular bearing information into circular coordinates.

A most important feature of the present invention is the provision of "circle data banks" comprising a plurality of related circles with each circle of each bank representing a selected angle subtended between the location of a reference station, a second station of known position, and the position of the vehicle. A second circle data bank is provided, identical to the first, but containing circular representations of substantially all possible angles subtended between the position of the reference station, the known position of a third station with respect to the reference station, and the position of the vehicle. Means are further provided for adjustably positioning each set of circle data banks in register with the known positions of the stations associated with each bank on a selected area chart, and means are also provided for selectively actuating a circle from each of said data banks in accordance with the stored angular bearing information. In accordance with the invention, the point of intersection of the circle selected from each circle data bank is the actual position of the vehicle. Means are therefore provided for visually indicating this point of intersection on the area chart of interest. As the vehicle continues in its course of travel, additional circles from each data bank are selectively activated and deactivated so that the course of travel of the vehicle is visually indicated on the area chart, in a substantially continuous fashion.

In accordance with the above, it is therefore another object of the invention to provide a radio navigation system which requires a minimum of input information. That is, all that is needed is the angular difference between the direction of a reference station and the direction of two other stations with respect to the instant position of a vehicle, in order to indicate such an instant position on a pictorial representation of the general area location of the vehicle. Thus reliance on polar information, such as the identification of true north or the relationship of magnetic north thereto, or the orientation of a chart to correspond with known magnetic bearings is eliminated. Magnetic compasses, distance measuring equipment, and speed indicators are not needed in the operation of the system of the present invention.

It is another object of the invention, therefore, to provide a vehicle navigation system in which the vehicle's heading may be changed at will without introducing erroneous position information, as the system does not rely on polar information for positioning computation.

Another feature of the present invention is the flexibility in the choice or sequence of the known, fixed stations. Any three fixed stations whose positions are known and which are located in a common area of interest may be used to provide the determination of the instant position of the vehicle. Their directions may also be determined in any sequence, regardless of their angular relationship to each other or to the craft's position. The radio stations associated with such fixed positions are not required to transmit at any particular frequency or in any particular frequency band. Furthermore, conventional radio stations with non-rotating, wide band antennas may be used.

For a better understanding of the invention, together with other and further objects thereof, reference is made to the following detailed description taken in connection with the accompanying drawings, in which:

FIG. 3 is a plan view of a portion of the automatic station selector;

FIGS. 3A, 3B are front views of the memory drum and reset disc of the station selector of FIG. 3;

FIG. 4 is a schematic circuit diagram of the station selector control circuit and null detector;

FIG. 4A is a diagram illustrating a feature of the operation of the null detector of FIG. 4;

FIG. 4B is a schematic diagram of circuitry for automatic selection of tuning bands of a radio receiver by the station selector of FIG. 4;

FIG. 5 is a sectional view taken along the lines 5—5 of FIG. 7;

FIG. 6 is a sectional view taken along the lines 6—6 of FIG. 7;

FIG. 7 is a side view of the bearing angle storage unit of the present invention in connection with a directional antenna;

FIG. 8 is a sectional view taken along the lines 8—8 of FIG. 7;

FIGS. 9, 10, 11 and 12 are circle diagrams illustrating the geometrical principles of the present invention;

FIG. 13 is an electro-luminescent embodiment of the the circle display unit of the invention;

FIG. 14 is a pictorial representation of the circle projecting apparatus of the invention;

FIG. 15 is an enlarged fragmentary view of a portion of the projecting apparatus of FIG. 14; and FIG. 16 is a perspective view of an embodiment of the position indicator.

The term "bearing" is broadly used herein. It refers to the imaginary line extending between first and second positions of interest and is synonymous with the word "direction." It is not to be considered as implying directional relationship with respect to polar or azimuth reference points, such as the north pole, north magnetic pole, selected stars or any other terrestrial reference points of the type usually employed in conventional navigation systems. The system of the present invention detects "bearings" between the instant position of a vehicle and known fixed positions of stations of interest; but such "bearings" have no relationship to anything, except to each other with regard to certain angular differences therebetween, as explained in detail hereinafter.

Figure 1:
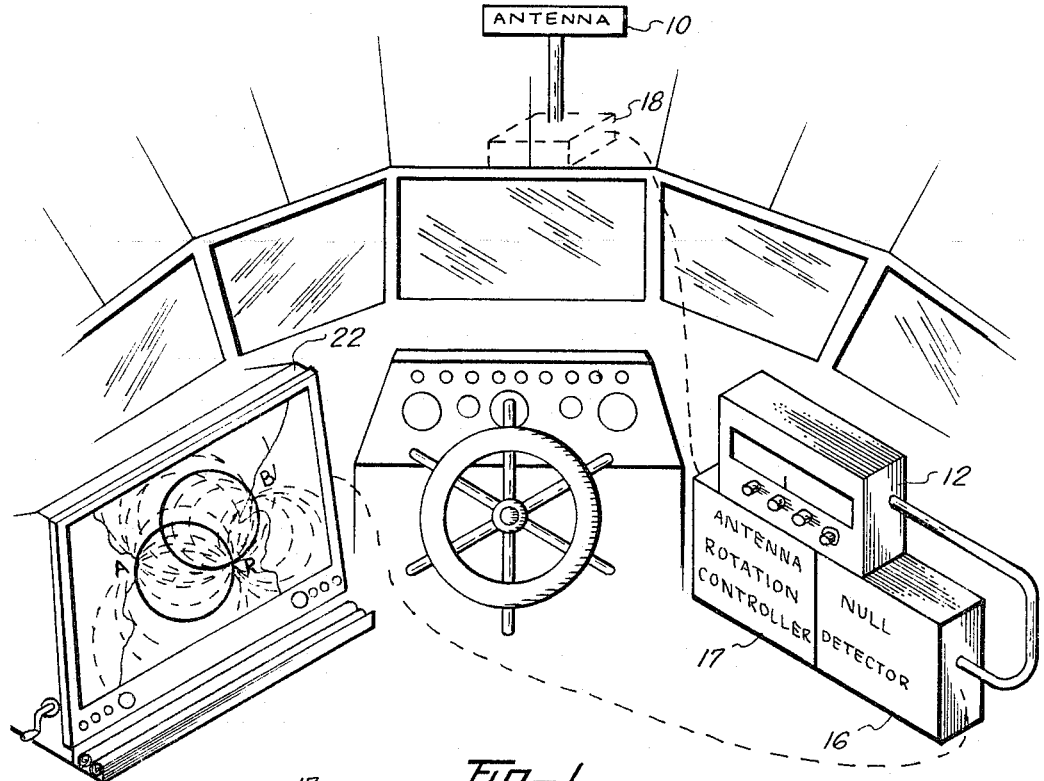
FIG. 1 is a pictorial representation of the invention as installed on a vessel.
Figure 2:
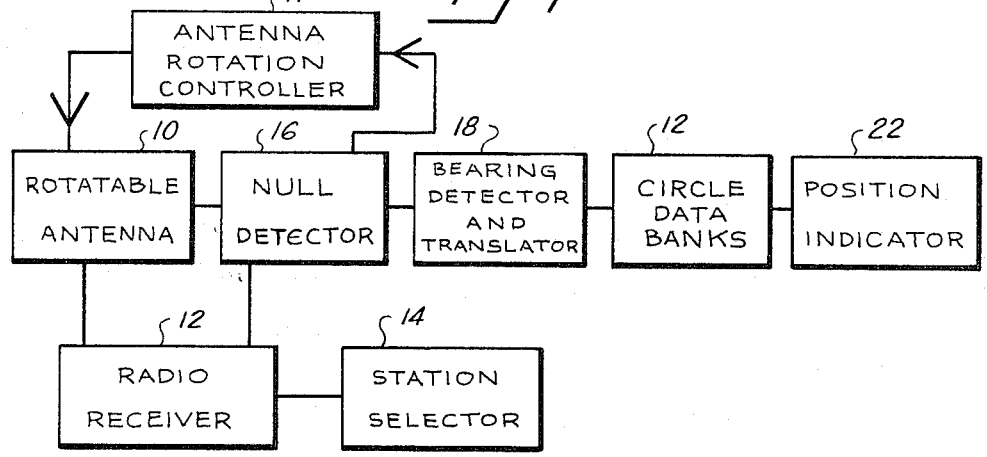
FIG. 2 is a block schematic diagram of the major units of the present invention.

Referring now to FIGS. 1 and 2, there is shown the major units which, in general, form the navigation system of the present invention. In general, signals received by a rotatable antenna of high directivity 10, carried by a vehicle whose position is to be determined, are fed to a conventional multiband radio receiver 12 of the type which is adapted to receive signals on the normal communication band frequencies such as the aircraft, broadcast or marine bands.

A station selector 14 is operatively associated with receiver 12 and may be mounted in the tuning section of the receiver. Station selector 14 has means for automatically tuning radio receiver 12 to each of three selected radio station frequencies in sequence, when it is actuated. Each station of interest is initially manually tuned on radio receiver 12 and then a presetting means for each station, associated with station selector 14, is actuated. Thereafter when the system is operated, station selector 14, will in sequence, cause radio receiver 12 to be tuned to each of the selected stations and will continue to operate in this manner until new stations are chosen and the frequency positions and frequency bands of such stations are reset.

Connected to radio receiver 12 is a null detector 16 which detects when rotatable antenna 10 is pointing in the direction of one of the three stations selected by station selector 14. Null detector 16 through antenna controller unit 17, also controls the rotating mechanism of rotatable antenna 10 and thus causes it to scan the horizon while the bearing direction of the station of interest is detected by the null detector. As soon as null detector 16 has ascertained that antenna 10 is pointing in the direction of the desired station, a bearing or direction detector and translator unit 18 is actuated causing information to be temporarily stored as to the position of the vehicle, with respect to the detected station, which information is ultimately expressed as the angle subtended between the detected bearing of two of the stations, with one of the stations being designated as a reference station, and with the vehicle at the apex of the angle. In a like manner, the angular difference between a third radio station bearing and the reference station bearing with respect to the vehicle's position is detected by null detector 16 and information representative thereof is stored in detector and translator unit 18. Any one of the three stations may be selected as the reference station, but its angular bearing need not be detected first.

The angular position information for both stations is then translated into selected signals which actuate a corresponding circle contained in circle data bank unit 20. For substantially every angle detected with respect to the position of the vehicle and reference station and one other station, hereinafter known respectively as stations R and A, there is a discrete circular representation thereof. While the diameters of the circles are different for each different angle, yet all of the circular representations have two common circumferential points, thereby forming a family of circles. The circles representative of the angular bearings with respect to stations A and R will be hereinafter known as circle data bank A.

Likewise, for all detected angles with respect to reference station R and the third station hereinafter known as station B, a second family of circles identical with the circles of data bank A are provided and are hereinafter known as circle data bank B. The circle data banks are stored in unit 20 and are structurally arranged so that for each detected angle between stations R and A, the corresponding circle in circle data bank A will be activated and likewise for each detected angle between station R and station B, a corresponding circle will be activated in circle data bank B.

The activated circles are caused to be visually indicated upon a position indicator 22 which preferably displays a map of the area in which the vehicle is located. By means to be described in detail hereinafter, each activated circle from circle data bank A and circle data bank B is caused to be displayed upon the area map of position indicator 22 with selected points of the circumference of circle A in register with the graphic locations of stations R and A on the area map, and with selected points on the circumference of the activated circle B in register with the graphic locations of stations R and B respectively on the area map. The circles will then necessarily intersect with each other to form a third point which is the actual location of the vehicle on the selected area map.

A pictorial representation of a portion of the system in assembled relationship and in use on a vessel such as a pleasure boat is shown in FIG. 1.

For purposes of description the invention will be described as installed on a marine vessel for determining the position thereof, but it will be understood that it is adapted to function equally as well in determining and displaying the position of a land vehicle or aircraft. A circle from each data bank is shown in FIG. 1 as being activated and displayed upon a map in position indicator 22 with the point of intersection of each circle, other than the common reference station point R, visually indicating the exact location of the vessel on a selected navigation chart. As the vessel progresses along its course, the system may be intermittently operated to indicate from time to time the progress thereof. Of course, it may be continuously operated if desired with new circles and new points of intersection constantly appearing as the vessel makes significant changes in position.

*Automatic station selector*

In order to obtain rapid, accurate and completely automatic operation of the entire system, an automatic station selector 14 is utilized. The station selector is adapted to select automatically the frequencies of at least three stations in a selected communication band, or a combination of bands, and renders all subsequent tuning and reselecting of such stations completely automatic after the initial manual presettings of the desired frequencies have been made.

An embodiment of a suitable automatic station selector is shown in FIG. 3, and is preferably housed in receiver 12, a portion of the front panel of which is designated as 24. The tuning section of receiver 12 is modified somewhat. A shaft 26 is provided upon which is mounted the usual variable tuning capacitor 28 which serves to change the frequency of the R.F. or input section of the receiver in the conventional manner. Shaft 26 is secured in a bearing 27, and is adapted to be rotated either manually or automatically, in a clockwise or counterclockwise direction. Also mounted upon shaft 26 are a plurality of drums 30, 32, 34. Each drum has a large number of axial bores 35, 37, 39 disposed near the outer periphery thereof which are adapted to slidably receive a plurality of corresponding pins 36, 38, and 40 respectively. The front view of drum 30, FIG. 3A, clearly shows the circumferential arrangement of bores 35 for receiving pins 36. Pins 36, 38, and 40 have flat heads 41, 43, 45 respectively, which are greater in diameter than their respective bores 35, 37, 39, and thus serve as a stop to prevent the pins from passing completely through corresponding bores.

Interposed between each set of pins 36, 38 and 40 and their corresponding drums 30, 32, 34 is a slidable disc 42, 44 and 46 which is normally spring biased against the end surface of its associated drum 30, 32, 34. Each disc has a set of axial bores arranged to register with the corresponding set of bores 35, 37, 39 in drums 30, 32, 34. The front view of disc 42, FIG. 3B, shows the circumferential arrangement of bores 47 for receiving pins 36.

Shaft 26 has an axial bore 49, in which is concentrically disposed a reset rod 48. Shaft 26 also has pairs of longitudinal slots diametrically disposed and designated as 50, 52 and 54. Each reset disc 42, 44 and 46 is rigidly connected to reset rod 48 through slots 50, 52 and 54 by means of arms 58, 60 and 62. Rod 48 is spring biased by spring means (not shown) in a direction away from panel 24 and towards variable capacitor 28.

Positioned adjacent the path of travel of pin sets 36, 38, 40 are the tapered points of three stations set rods, 64, 66 and 68 respectively. The station set rods are supported by bearings 70, 72 and 74 and are biased in a direction towards the rear of panel 24 by means of coaxially mounted springs 76, 78 and 80. Rods 64, 66, 68 terminate in set buttons 82, 84, 86 (R, B, A) which are positioned on the face of panel 24.

Each of pins 36, 38, 40 is representative of an angular position of tuning shaft 26 and thus is representative of the dial position of a radio station of interest. Each pin has two positions, "normal" and "set," but in operation only one pin from each of drums 30, 32, 34 will be set at any instant. In operation the pins may be set to the dial position of the stations selected for station R, station B, and station A by, in sequence, first manually rotating tuning shaft 26 by means of a knob 88 to the dial position of station R, then pushing button 82 to cause one of pins 36 to move axially away from the rear of panel 24. Next, station B may be set by locating its dial position, and pressing button 84 to cause one of pins 38 to move axially away from panel 24 and into its set position. In the same manner the selected dial position of a desired station A is set by pressing button 86 to cause one of pins 40 to move axially into its set position. It will be seen that a station selector pin in a "set" position will, in effect, memorize the position of the tuner shaft at which the desired frequency was obtained.

When it is desired to move all of the pins into their normal or reset positions and thus clear the station selector, shaft 48 is pulled in an outward direction away from the face of panel 24. As reset discs 42, 44, 46 are rigidly attached to shaft 48 through arms 58, 60, 62 respectively, movement of the shaft causes the discs to move axially along shaft 26 towards panel 24, and away from drums 30, 32, 34. Reset discs 42, 44, 46 then engage the heads 41, 43, 45 of those pins 36, 38, 40 which are in a "set" position and shift them to a reset position.

The electrical circuitry for causing the station selector 14 to select automatically the pre-chosen frequencies for stations A, B and R, pause after each station has been tuned in until the directional antenna 10 has automatically nulled on the tuned in station and then causes the next station to be selected and tuned in, will now be described.

A feature of the invention is that after the frequencies for the three selected stations to be designated as A, B and R have been initially set in the manner described above, the station selector will henceforth render automatic all subsequent tuning of these stations.

Referring again to FIG. 3, positioned rearwardly of drums 30, 32 and 34 are leaf actuated switches S12, S11, and S10, which have conventional leaf actuators 94, 92, and 90 respectively, positioned in alignment with the pointed ends of set rods 64, 66 and 68. The leaf switches are disposed sufficiently close to drums 30, 32, and 34 to allow those pins from pin groups 36, 38, 40, which have been placed in a set position by previous manual operation of rods 64, 66, and 68, to actuate switch leaves 90, 92 and 94 when an associated set pin is in engagement therewith. Thus, each of switches S10, S11, and S12 will close when the selected station position memorized by the set pins of drums 30, 32 and 34 has been "read out." The arrangement and design of switches S10, S11, and S12 is such that pins 36, 38 and 40 may rotate freely past the switch leaves 90, 92 and 94, yet depressing them as they pass without being stopped thereby.

Referring now to the schematic circuit diagram of FIG. 4, switches S10a, S11a and S12a are single pole double throw switches and are operatively connected to stop tuner driving motor M1 when the dial position of each one of the desired stations (A, B, R) has been reached. Motor M1 (FIG. 3) is attached to tuning shaft 26 and is adapted to rotate the tuning shaft in either a clockwise or counterclockwise direction as may be necessary. Motor M1 is energized from a source of positive voltage 200 which may be, for example, 12 volts D.C.

Power is applied from source 200 through the number 3 position of a multiposition switch S1, through the contacts of switches S10a, S11a and S12a, when in a normally inactivated position to line 202 and thence through the contacts of a polarity reversing relay K1 to the input terminals 204, 206 of motor M1. When the several contacts of relay K1 are in the arrangement as shown in FIG. 4 so that positive voltage from line 202 is applied to motor terminal 206 through closed contacts K1a, and motor terminal 204 is connected to ground through closed contacts K1c, then motor M1 will rotate shaft 26 in a selected direction, preferably counterclockwise as viewed from the face of panel 24 (FIG. 3).

Positioned adjacent shaft 26 are limit switches S4 and S5 which are double pole, single throw, normally open impulse type, leaf actuated switches, operated by cam pins 96 and 98 which are respectively mounted on shaft 26. Switch S4 is adapted to be actuated by cam pin 96 only when shaft 26 has reached its extreme counterclockwise position and pin 96 is so located. Switch S5 is so positioned that its associated cam pin 98 will cause actuation thereof only when shaft 26 has reached its extreme clockwise position. Switches S4 and S5 have normally open contacts S4a and S5a connected in parallel with each other and in series with the positive terminal of power supply 200, and one terminal of the actuating coil of relay K1.

Relay K1 is an impulse latching type relay. When it is actuated by a single electrical impulse from either limit switch contacts S4a or S5a, the polarity of the voltage applied to terminals 204, 206 of motor M1 is reversed, and the direction of rotation of tuner shaft 26 is reversed. Thus, tuner shaft 26 is prevented from exceeding its extreme clockwise or counterclockwise travel by operation of switches S5a and S4a respectively.

Control of the operation of motor M1 by drum switches S10, S11, and S12 is bypassed and overridden by the closing of contacts K7a of a dual coil latching relay K7. Contacts K7a are connected between line 202 and the common junction point 208 for one contact of switches S10, S11 and S12. If contacts K7a are closed then the opening or closing of switches S10a, S11a, S12a will have no effect upon the operation of motor M1. This bypass circuit provided by contacts K7a allows switches S10a, S11a, S12a to be operational only when tuner shaft 26 originates its sweep from the furthermost counterclockwise position, which might otherwise result in the omission of one or more of the three station frequency positions when station selector 14 is initially turned on.

Latch relay K7 has the usual latch and unlatch coils K7L and K7U respectively. As shown in FIG. 4, the contacts K7a, K7b, K7c, are in the normal, unlatched position. To insure that the unit is started with the contacts in this position, starting switch S1 has a position #2 connected to the ungrounded terminal of relay coil K7U. If relay K7 were in a latched condition upon startup, the momentary connecting of contact #2 of switch S1 to power supply 200 as switch S1 is rotated to position #3 will momentarily energize coil K7U and cause relay K7 to unlatch.

Switches S4, S5 also have normally open contacts S4b and S5b which are respectively connected to the ungrounded terminals of latch coil K7L and unlatch coil K7U of latch relay K7. These contacts are actuated in the same manner as contacts S4a and S5a so that at the extreme counterclockwise position, switch contacts S4b energize coil K7L and causes contacts K7b to close and contacts K7c to open. Upon closure of contacts K7b, the by-pass circuit for switches S10a, S11a, S12a is opened, allowing motor M1 to receive its energizing current only when all of switches S10a, S11a and S12a are closed. Thus, whenever tuning shaft 26 has reached its extreme counter-clockwise position and has started towards the clockwise direction, motor M1 will be stopped as soon as one of switches S10a, S11a, S12a is opened by actuation of the first one of set pins 36, 38, 40 to be engaged. Likewise, at the end of the extreme clockwise rotation of tuning shaft 26, unlatch coil K7U is energized by closure of switch contacts S5b which causes contacts K7a, and K7c to reclose as before.

The operation of the automatic station selector in connection with the circuitry just described is as follows. When the unit is switched to "on," the pulse obtained from switch S1, contact #2 places the relay K7 in an unlatched state by energizing reset coil K7U. Thence the tuning shaft motor M1 rotates towards its counter-clockwise limit. During this movement, switches S10, S11 and S12 are inoperative. When the extreme counter-clockwise position has been reached, the contacts of limit switch S4 are closed, simultaneously causing the direction of rotation of tuner shaft 26 to reverse and causing latching relay K7 to assume its latched position upon momentary closure of switch contact S4b. Drum switches S10, S11, and S12 are now in an operative condition.

The tuning shaft 26 continues to rotate clockwise until a "set" station selector pin of one of drums 30, 32 or 34 actuates the corresponding leaf of its drum switch S10, S11, S12. This simultaneously provides a source of energy to nulling circuit 16 and antenna motor controlling circuit 17 by means of control line 210, which is connected to now closed contacts K7b. Tuner motor M1 is also de-energized at this point by the actuation of one of switches S10, S11, S12 so that the receiver is now tuned to the frequency of one of the previously selected stations. The automatic station selector unit 14 will remain in this condition while the antenna scanning and station nulling operation is under way and until bearing detector and translator unit 18 has selected a circular coordinate from circle data bank 20, the details and operation of which will be described hereinbelow.

When the nulling, bearing translating and circle selecting operations have been completed, a pulse is received on line 202. The received pulse is applied to tuner motor M1, and has a duration sufficient to cause tuner shaft 26 to rotate, so that the previously actuated drum switch is free of its associated set station selector pin. Since each of the drum switches are now in deactuated states, motor M1 will continue to rotate tuning shaft 26 in a clockwise direction until one of the two remaining set station selector pins actuates its drum switch S10, S11, or S12. The sequence of operation just described is then repeated for this station.

Upon completion of the operation, the tuner shaft then continues to rotate until the third and last drum switch of the S10, S11, S12 group is actuated. After the operating steps for the station represented by closure of this last switch are completed, the tuner shaft 26 rotates to its extreme clockwise limit, at which time limit switch contacts S5a are actuated as described above, resulting in the reversal of direction of rotation of tuning shaft 26, and latching relay coil K7U is again momentarily energized by closure of switch contacts S5b to cause latch relay K7 to assume its unlatched position.

As will be explained in detail hereafter, a positional display of the vessel is now projected onto the surface of a selected area chart in the manner pictorially shown on the face of indicator unit 22 of FIG. 1. This display is maintained until tuner shaft 26 reaches its extreme counterclockwise limit, at which point station selector unit 14 starts a new cycle. Hence, the system will continuously monitor the vessel's position until the positional information is no longer required. At this point the operator rotates switch S1 to position 1 to turn the unit off.

While the operation of the station selector 14 has been described in connection with a radio receiver which receives the three fixed station signals on a single frequency band, yet the station selector will function equally as well if one or more of the fixed stations are on other frequency bands. By connecting additional contacts from switches S10, S11, S12 to actuate appropriate band switching circuits, multiband operation may be provided. For example, a simplified circuit for automatic band selection is shown in FIG. 4B, wherein circuitry for automatically switching the band of a single tuned circuit is illustrated.

A conventional band switch unit 250 is shown as having a wiper arm 252, and contacts A, B, C, and Automatic. Contacts A, B, C, are connected to the band selecting portion of a receiver tuning unit, such as taps on a tuning coil, by means of lines 254, 256, 258. In nonautomatic operation, actuation of arm 252 selects a desired frequency band. For example, engagement of contact A may select the radio beacon band, engagement of contact B may select the broadcast band, while engagement of contact C may select the marine band.

Connected to lines 254, 256, 258 are branch lines which respectively connect to contacts A', B', C' of selector switch arms 260, 262, 264, which in turn, are respectively connected to normally open contacts S10b, S11b, S12b of switches S10, S11, S12. The other terminals of contacts S10b, S11b, S12b are commonly connected to wiper arm 252.

In operation, when the operator of the system initially tunes to the three stations, he also sets the corresponding band selector switches to the proper band positions by manipulating switch arms 260, 262, 264. Thus, one station selected may be on band A, another on band B, and the third on band C, if desired. The wiper arm of the normal band switch is placed in "Auto" position. Thereafter all subsequent band selection will be accomplished automatically, as drum switches S10, S11, S12 are operated. Of course, the circuitry shown herein is greatly simplified for the sake of brevity. In practice, several identical circuits are provided as needed to switch a like number of tuning circuits in modern, multiband radio receivers.

The present invention is not limited to the use of a single radio receiver, as several radio receivers, one for each station, may be utilized, if desired. If the automatic station selection feature is desired, the tuning shafts of the several receivers should be operated together with the station selector shaft 26.

As will be seen in connection with the description of the bearing detector and translator unit 18, the three stations need not be selected manually or automatically in any particular sequence. That is, the reference station need not be selected first, then A and B. It is only necessary to designate the stations as A, B and R when "setting" the drum pins 36, 38, 40. Thereafter, the tuning and selection order is immaterial.

*Automatic bearing detector and translator*

Referring now to FIGS. 4, 7, antenna 10 which may be a conventional direction finding antenna, such as a loop or goniometer type, is adapted to be driven at least 370 degrees in either a clockwise or counter-clockwise direction by a suitable reversible driving motor M2. Reversal of the antenna is effected chiefly by means of an impulse, latching type relay K3, an electrical circuit component included in antenna rotation controller unit 17. The energizing terminals 212, 214 of antenna motor M2 (FIG. 4) are connected to the movable contact arms of double pole, double throw, reversing relay K3. Thus, when the relay is in a first state as shown in FIG. 4, positive voltage from power supply 200 is applied to terminal 212 through lines 210 and 216 to closed contacts K3d, and a ground connection is made to terminal 214 through closed contacts K3b. Polarity reversal is secured when latching relay K3 is in its second position, whereby terminal 214 is connected to line 216 through contacts K3a and terminal 212 is connected to ground through contacts K3c.

Energization of relay K3 to reverse antenna motor M2 is secured by actuation of limit switches S6 and S7 mounted on antenna shaft 300, FIG. 7. Limit switches S6 and S7 are cam operated switches of the type which are actuated only in one direction of movement of an associated cam actuator. Movement of the cam actuator in the opposite or return direction may again operatively engage the switch but will fail to actuate the switch contacts.

Limit switch S6, a normally closed switch, is positioned on shaft 300 and is actuated by a cam 301 when the antenna shaft is in a counter-clockwise limiting position, for example, approximately 365 degrees. Limit switch S7 is identical to limit switch S6 with the exception that it is located with respect to antenna shaft 300 that it may be actuated only when shaft 300 has rotated in a clockwise direction to its extreme limit, for example approximately 365 degrees.

Both switches S6, S7 operate to prevent antenna 10 from exceeding its maximum sweep in either the counter-clockwise or clockwise direction. These normally closed switches are connected in series with positive line 210, normally closed switches S13a, S14a, S15a, and the ungrounded contact of relay K3. As mentioned above, relay K3 is an impulse latching type which will latch sequentially in one of two positions each time an impulse is received by the coil of relay K3. When the impulse is removed the relay will remain in one of its latched states until application of another impulse causes it to switch to its second latched state.

Thus, when shaft 300 rotates in a counter-clockwise direction sufficient to actuate switch S6, the contacts thereof will open. This action will release the actuating mechanism of relay K3 and allow it to assume a neutral position, although the condition of its contacts have not yet changed. As soon as cam 301 passes beyond the actuating range of switch S6, with shaft 300 still rotating in a counter-clockwise direction, switch S6 again closes and delivers an impulse to relay K3. The relay K3 is then actuated, is latched in its second sequential state, and the polarity of the voltage applied to terminals 212, 214 of antenna motor M2 is reversed by closure of contacts K3a, K3c and opening of contacts K3b and K3d. Antenna shaft 300 thereupon commences to rotate in a clockwise direction. Switch S6 is not again actuated as cam 301 passes by its position, because of the nature of the switch design, so that antenna 10 continues to rotate until clockwise limit switch S7 is actuated by its cam 303. The operation just described is then repeated, except that this time the direction of antenna shaft 300 is reversed from clockwise to counter-clockwise.

Potential for operating and reversing antenna motor M2 is applied thereto by line 210 which is connected to the positive terminal of supply 200 when one of the automatic station selector drum switches S10, S11 or S12 are closed.

The bearing detecting and translating unit 18 shown in FIGS. 5–8 will now be described. The translating unit is utilized to store temporarily the angular differences between the imaginary bearing lines extending to the vessel from the two transmitting stations A and B, with respect to the third station R, and as detected by the automatic nulling operation of the antenna, subsequently described in detail herein. The angular difference information for each station so detected is translated into a signal which is operative to select, for each angle, the proper circular coodinate from the stored sets thereof in circle data banks 20.

Referring to FIGS. 5 and 7, mounted on antenna shaft 300 is a semi-circular wafer 302 formed from insulating material, which has a plurality of discrete contacts imbedded near its outer periphery forming contact sets on both sides thereof and insulated from each other. These sets of contacts generally designated as 304 and 306 are representative of the degrees of a circle with the center of the semi-circle of contacts being designated as zero degrees and the two ends thereof designated respectively as +90 and −90 degrees. Connections are made to each contact and are brought out through a support collar 308 to cable 310 whence they are connected to individual circle coordinates stored in circle data banks 20, as described in more detail below. The zero degree contact represents the direction of reference station R. Contact wafer 302 is free to rotate about shaft 300 as it is supported by collar bearing 308 but it is prevented thereby from axial movement.

Affixed to contact wafer 302 is a locking solenoid L3 which is located thereon so that its operating plunger 309 is oriented in alignment with the zero reference contact. Antenna shaft 300 has two key ways 312, 314 axially disposed in a plane common to the ends of directional antenna 10. When solenoid L3 is energized and the antenna is caused to rotate, one of key ways 312, 314 will be rotated eventually to a position which enables plunger 309 of solenoid L3 to slide into the mating key way. Henceforth, and until solenoid L3 is de-energized, the zero reference contact will be aligned to the pointing or nulling ends of the antenna 10.

Mounted above contact wafer 302 on antenna shaft 300 is a freely rotatable arm 316 which is also maintained in its axial position by means of a collar bearing 318. As shown in FIGS. 6, 7, arm 316 has a pair of contact wipers 320, 322 disposed near the end thereof, which are adapted to slide across and make electrical connection with upper contacts 304 of wafer 302 as arm 316 rotates. Wipers 320 and 322 are connected to ground and thus complete a circuit from the circle data banks through cable 310 and one of contacts 304 to ground. Since wafer 302 is semi-circular, one of the wipers of arm 316 will always be in a position to sweep the contacts. Thus, in operation, when arm A comes to rest by means about to be described, the antenna is at this point homed on station A and the position of the arm is representative of the direction of the antenna when homed.

Mounted upon arm 316 and in longitudinal alignment therewith and with wipers 320 and 322 is an alignment locking solenoid L1 which is similar in operation to that of solenoid L3 just described. Solenoid L1 also has a plunger shaft 324 which is adapted to register with one of key ways 312, 314 of shaft 300 when it is in mating alignment therewith. At this point, the nulling ends of antenna 10 are in alignment with the contact wipers 320, 322 of arm 316 in the same manner as obtained when solenoid L3 aligns wafer 302 and its associated zero contact. Hence when antenna 10 is homed on station A, arm 316 will be representative of the direction of station A.

A third arm 326 is similarly mounted on antenna shaft 300 by means of collar bearing 327 in the same manner as arm 316 but in a position below wafer 302. Arm 326 also has a contact wiper 328, 330 disposed near the outer ends thereof which is adapted to engage the lower contact set 306 of contact wafer 302. It performs functions identical to those of arm 316 and is locked to one of the key ways 312, 314 of antenna shaft 300 by means of a solenoid plunger 332 when its solenoid L2 is actuated. Solenoid L2 is disposed on arm 326 in a manner identical with that of L1 on arm 316.

When solenoid plunger shaft 332 is in locking engagement with one of the key ways 312, 314, the resulting position of arm 326 is then representative of the direction of station B. At this point the antenna will be nulled on station B so that the contact which is actuated by one of the wipers 328, 330 will be representive of the bearing direction of the antenna when homed.

Since the three directions are now established, the disposition of the contact wipers 328 or 330, and 322 or 320 with respect to the zero contact of wafer 302 will be representative of the actual angular difference between stations B and A respectively and the selected reference station R.

Summarizing, it will be seen that the zero degree contact on wafer 302 is used as a reference point relative to the actual bearing direction of the reference station R as determined by the antenna 10. The upper surface of the contact bank 302 is used to establish the angular difference $\alpha$ between the reference station and the station A. The lower portion of the contact bank is used to establish the angular difference $\beta$ between the reference R and station B. Each contact to the left and right of the zero degree contact is representative of a particular angular difference. The number of contacts is progressively increased as the angular difference to be represented approaches zero degrees. The contact bank is preferably designed in this manner in order to maintain accuracy even as the distance between the vessel and the transmitting station is increased, and the angular difference approaches zero degrees.

It will be noted that each of the solenoid operating plungers 309, 324 and 332 has a projecting finger 334, 336, 338 which, when in an operating condition, is adapted to engage associated switches S15, S14, and S13, respectively. These switches are actuated when the plungers of solenoids L1, L2, L3 slide into one of key ways 312 or 314. The purpose of switches S13, S14, S15 is to render the nulling circuitry inoperative for the brief period of time while alignment of contact bank 302 or arms 316, 326 are being obtained. This eliminates the possibility of an antenna nulling signal being detected before alignment is accomplished. The relation of these switches to the control circuitry will be described below.

Null detector

Directional antenna 10 is of the type wherein the antenna is rotated until it reaches a point where its output signal is the weakest. This is generally indicated by a sharp dip in signal strength and comprises a nulling point. At this position the antenna is pointing in the direction of the desired station. In accordance with the present invention, an automatic nulling circuit is provided which causes the antenna 10 to rotate until the nulling point and hence the direction of the desired station has been automatically determined. As soon as this information is stored by the disposition of either the zero degree contact of wafer 302, arms 316 or 326, as described above, and their corresponding solenoids L1, L2, or L3 have been released, the antenna is again automatically rotated until the bearing direction of the next station in sequence, as determined by the automatic station selector unit 14, has been ascertained.

Null detector 16 is responsive to changes in the amplitude of the conventional AVC current of receiver 12. When the antenna 10 points to the desired station, the AVC current output of the receiver is at a minimum or null point, whereas, when the antenna is perpendicular to the direction of the station, maximum AVC current is present. Of course, the maximum, minimum values are not necessarily constant for different transmitting stations. However, by causing the vessel's antenna to rotate, and by providing means for detecting and recording the relative direction of the antenna at each null point as it is determined, the information will then be available for establishing the angular difference between the transmitting stations of interest with respect to the vessel's antenna.

Referring again to FIG. 4, a conventional meter type relay K2 is provided which is responsive to the minimum and maximum values of AVC current present at the usual AVC bus of the receiver 12. A current sensitive meter with a range capable of monitoring the minimum and maximum values of AVC current is preferred, although a voltage sensitive meter may be used if desired. This meter relay K2 has an actuating coil 220 connected in series with the AVC line through leads 222 and 226. Values of AVC current below a predetermined limit will thus cause a grounded movable contact arm 228 of relay K2 to engage relay contact 230 and compart a path to ground. Values of AVC current above a predetermined limit will cause contact arm 228 to engage contact 232 of relay K2 and thus provide a path thereto to ground.

Contacts 230 and 232 are non-locking, adjustable limit contacts. Contact 230 is the minimum limit contact and is set to a marginal value less than the lowest null value of AVC current provided by any usable transmitting station signal. Contact 232 is the maximum limit contact and is initially set to a marginal value greater than the highest null value of AVC current of any usable transmitting station. It is preferable, for purposes of expediting the rapidity of successive fixes on the selected transmitting stations, that adjustable contacts 230 and 232 be set as close to the null values as possible without exceeding the marginal values just mentioned. It will be noted that when the AVC current is equal to the setting of the minimum limit contact 230, this contact will then be actuated.

Contact 232 is connected to one terminal of a slave relay K5, the other terminal of which is connected to positive voltage line 210. Across the terminals of K5 is an AVC compressing diode 231. Contact K5a of relay K5 is connected to the ungrounded terminal of the coil of antenna reversing relay K3. The movable contact arm 233 of relay K5 is connected to the junction of switches S7 and S13a. Thus, it will be seen that when contact 232 completes a circuit path to ground for the coil of relay K5 through contact arm 228 when the AVC current is equal to or greater than the setting of this contact, current will be applied to the coil of relay K3 through contact K5a, thereby causing antenna drive motor M2 to reverse its direction.

When contact 232 is disconnected from actuating arm 228 because the AVC current applied to coil 220 is insufficient to cause arm 228 to engage contact 232, then a current path will be completed from positive line 210 through now closed contacts K5b and one of closed switches S13b, S14b, or S15b, depending upon which of the translator solenoids L1, L2, L3 have been actuated, to an actuating coil 234 of a stepper relay S3. Switches S13b, S14b, S15b are normally open contacts and are a component part of switches S13, S14, S15.

Stepper relay S3 has its drive shaft 236 connected to contact 230 and is adapted to advance contact 230 in increments towards the position of contact arm 228 each time coil 234 receives an advancing impulse. Stepper relay S3 is of the type wherein its driving arm 236 is advanced one selected increment only, when a discrete input impulse is received by its advancing coil 234. That is, there must be a separate make and break for every advancement thereof. Thus, stepping relay S3 will mechanically advance minimum limit contact 230 one increment higher towards the ultimate null setting each time contact K5b is connected to positive line 210 by de-energization of slave relay K5.

If contact 230 has not been advanced sufficiently to be connected to movable contact arm 228 for a particular sweep of antenna 10, indicating that it has not been just previously advanced to a value equal to the actual null value of AVC current sufficient to connect contact 230 to ground through arm 228, the antenna will again sweep through the null point or point of minimum AVC current and the AVC current will again rise to a value equal to the engaging setting of contacts 232. At this time the antenna will reverse in the manner just described and a second sweep in the opposite direction will result. These oscillating sweeps will continue until the minimum limit contact 230 is advanced incrementally by stepper relay S3 to a setting equal to the setting for the actual detected null value. On the particular antenna sweep during which this action is accomplished, the antenna will sweep to the null and contacts 230 will be actuated. Thus, it will be seen that depending upon the setting of adjustable contacts 232, antenna 10 will oscillate a minimum amount of plus or minus degrees from the direction of the transmitting station of interest, until a null is obtained.

Upon closure of contacts 230 relay K4 is activated, thereby opening contacts K4b and closing contacts K4a. This operation removes power from solenoids L1, L2, L3, depending upon which solenoid has been energized, and thus allows the associated plunger locking pin 309, 324 or 332 to be de-actuated, thereby freeing arm 316, 326 or wafer 302, as the case may be, from further rotation by shaft 300. The instant that the null is obtained, the resulting position of either wafer 302, or arm 316 or 326 will represent the direction of the station and subsequently store the angular position of the transmitting station whose bearing is being determined.

Closing of contacts K4a causes other events to happen. Stepper relay reset coil 238 is energized, thereby causing contacts 230 of relay K2 to return to their initial position. Current is once again supplied to line 202, thus causing motor M1 of station selector 14 to begin to rotate and recommence the tuning process for tuning in the next station. As soon as tuner motor M1 begins to rotate, the activated drum switch S10, S11, or S12, is now de-activated by rotation of its corresponding "set" pin 41, 43 or 45 away from the actuating arm of the corresponding switch.

When switch S10a, S11a, or S12a is de-activated and returns to its normal position (1), power is removed from junction 208 and line 210, thereby de-activating the null circuit and antenna motor M2. The antenna will then remain sationary while the automatic tuning process is completed for the next station whose bearing is to be determined.

Alignment monitoring or detecting switches S13a, S14a and S15a serially connected to limit switches S6, S7 and the coil of relay K2 by-pass contacts K5a, K5b when these switches are de-activated during periods when antenna translator alignment has not yet been accomplished. Premature antenna reversal by operation of relay K5 is thereby prevented. Thus until alignment occurs and one of switches S13a, S14a or S15a is activated, limit relay K5 is rendered inoperative and a circuit connection from limit switches S6 and S7 through S13a, S14a and S15a to polarity reversing relay K2 is available.

It is possible on rare occasions to obtain alingment of either wafer 302, or arm 316, or 326 immediately after automatic station selector 14 has caused antenna 10 to begin to rotate and search for such alignment. Coupled with this, is the possibility that the AVC current is less than the present value of contact 232 and the antenna is rotating in a direction towards a null position but will encounter its clockwise or counterclockwise limit condition before the null position is reached. If alignment had not already occurred, then either of limit switches S6 or S7 would have actuated polarity reversing relay K3 and caused antenna motor M2 to reverse and rotate in the opposite direction. However, if alignment has occured as mentioned above, then one of switches S12a, S14a, or S15a will have opened, and since the AVC current is below the value of the preset contact 232, i.e. contact K5a is open, the actuation of switches S6 or S7 is ineffective, as the normal circuit paths to relay K3 are now opened. In this situation the antenna 10 will continue to rotate past S6 or S7 until one of emergency limit switches S8 or S9 is actuated.

Switch S8 is positioned along the path of travel of antenna shaft 300 at a position one or two degrees beyond switch S6 and is capable of counterclockwise actuation only. Switch S9 is positioned a degree or so beyond the position of switch S7 and is capable of clockwise actuation only. Both of switches S8 and S9 are of the type which have a delayed or slow release once they have been actuated. Switches S8 and S9 are connected in parallel with each other and in parallel with the series connection of switches S12a, S14a, S15a and thus, when closed, provide additional circuit paths from line 210 to the coil of relay K3. Thus, if antenna shaft 300 rotates beyond the positions of either switch S6 or switch S7 and these switches are de-activated as far as control of relay K3 is concerned, then either switch S8 or S9 will be closed by associated cams 305, 307. Relay K3 will be energized and thus cause antenna motor M2 to reverse.

It is important that switches S8 or S9 remain actuated for a period of time after antenna 10 has reversed and has begun to rotate in the opposite direction. The reason for this can best be seen with reference to FIG. 4a, which is a diagram of the AVC current appearing at line 226, with respect to antenna rotation. Assume that the antenna has rotated to point a, on the AVC curve, whereupon relay K3 is actuated by closure of either switch S8 or S9 at this point. The antenna will reverse its rotation, causing the AVC curve to rise to at least point b. If either switch S8 or S9 had opened immediately upon reversal, then as soon as point b was reached, contacts 232 would close and cause another reversal so that antenna 10 would oscillate between point a and point b. However, as mentioned above, switches S8 and S9 are of a slow relase type with sufficient delay so that antenna 10 may rotate sufficiently to allow the AVC current to rise to a value somewhere between point b and c before either switch S8 or S9 releases. Since contacts K5a close as soon as the AVC current rises to point b, the contacts then act as a holding circuit for relay K3 after switch S8 or S9 is deenergized at point C. Thus, antenna 10 will not again reverse but will continue to rotate until either the null point e is detected by contacts 230, as described above, or until point f is reached. At this point the AVC current has risen to a sufficiently high value to close contacts 232 and again cause reversal but the antenna will now sweep back and forth between points f and d, until the null position is found and relay K4 is actuated.

*Circle data banks*

The angular bearings for stations A and B with respect to the position of station R, temporarily stored in bearing detector and translator unit 18 by the positions of arms 316 and 326 with respect to contact wafer 302, are translated into circular coordinates by activation of a corresponding "angle-circle" stored in circle data bank unit 20. Substantially all possible angular dispersions between stations A and R and stations B and R are represented by two sets of angle-circles and designated as CDBA and CDBB (FIGS. 4, 13). The circles are of different magnitudes, each representative of a particular angular dispersion and cover a range from zero to plus and minus 90 degrees. Each circle of each set is fabricated in a manner such that it may be selectively actuated by the establishment of the position of arms 316 or 326 with respect to wafer 302, in a manner such that a circle from each bank is selected and displayed to the operator on a chart of the area. When the circles have been properly oriented as described in detail below, their common point of intersection will indicate the exact position of the vessel on the selected area map.

The theory of the "angle-circle" coordinate arrangement for indicating true position will now be discussed. Referring to FIG. 9 wafer 302 is indicated in diagrammatic form as 302a, and likewise arms 316 and 326 are indicated as 316a and 326a. Assume that it has been determined by bearing detector and translator unit 18 that stations A and B lie at respectively minus 20 degrees and plus 40 degrees with respect to station R. Then, by the geometric theorem that "angles inscribed in the same segment of a circle are equal," it follows that the particular angle α formed by the lines of the radiowaves originating from station A and reference station R and terminating at the vehicle's antenna may be inscribed in an infinite number of positions in the same segment of a circle. Accordingly, if a circle is constructed by taking the perpendicular bisector of the actual relative distance between station A and reference station R, this distance now becoming the chord of a circle, and a circle C is drawn having a radius at an angle of 20 degrees with the perpendicular bisected and extending to point A for the example given, then the apex of any angle which touches the circumference of the circle and which has its sides extending to points A and R will be a 20 degree angle. Thus an infinite number of 20 degree angles disposed around the circle C are possible. In FIG. 9 the construction just described is shown for a minus 20 degree circle. In the same manner upon the chord extending between stations R and B, a second circle D is drawn for the 40 degree β angle. Likewise, the apex of any angle lying in circle D whose sides extend to points R and B will be a 40 degree angle. Then it follows that the point of intersection of the two circles V10, is the exact location of the vessel with respect to stations A, R and B. This is confirmed by the construction of lines 316b and 326b with respect to line 302b and the angular measurements therebetween of 20 and 40 degrees, respectively.

Figure 10:
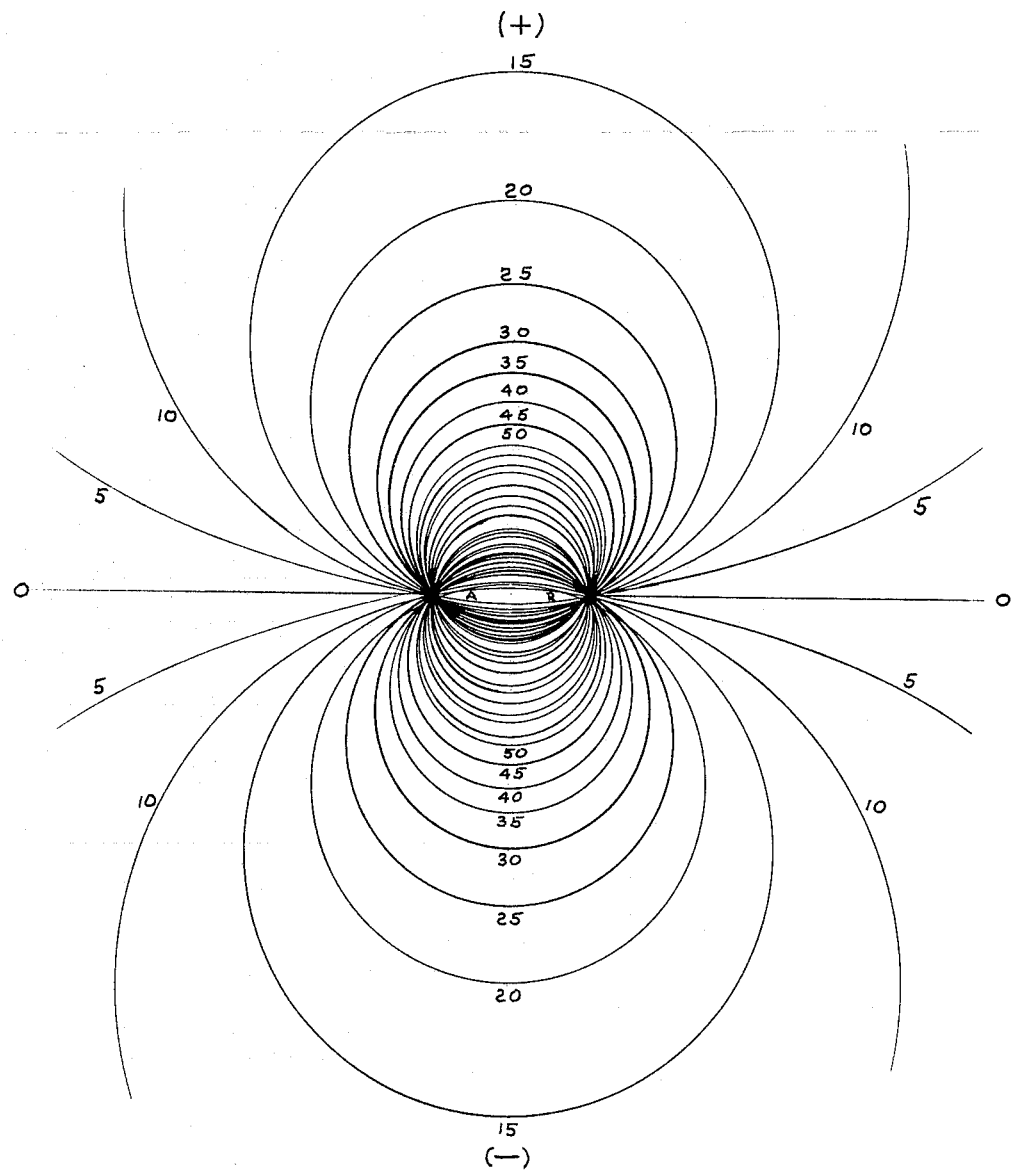

A family of angle-circles comprising CDBA is shown in FIG. 10. Circles representing angular differences of every five degrees are inscribed about a common chord extending between points A and R which represent station A and reference station R, respectively. The angle-circles extend about either side of the chord and represent positive and negative angles. For the chord extending between reference station R and station B, a corresponding set of circles are provided in the circle data bank unit 20.

While only circles which are multiples of five are shown by way of example, it is understood that in practice a family of circles may contain more or less than a circle for every fifth degree of angular difference. Preferably, the number of angle-circles should be progressively increased as the angular differences approach zero, since the geographical difference between each "circular degree" for the small angles is much greater.

Figure 11:
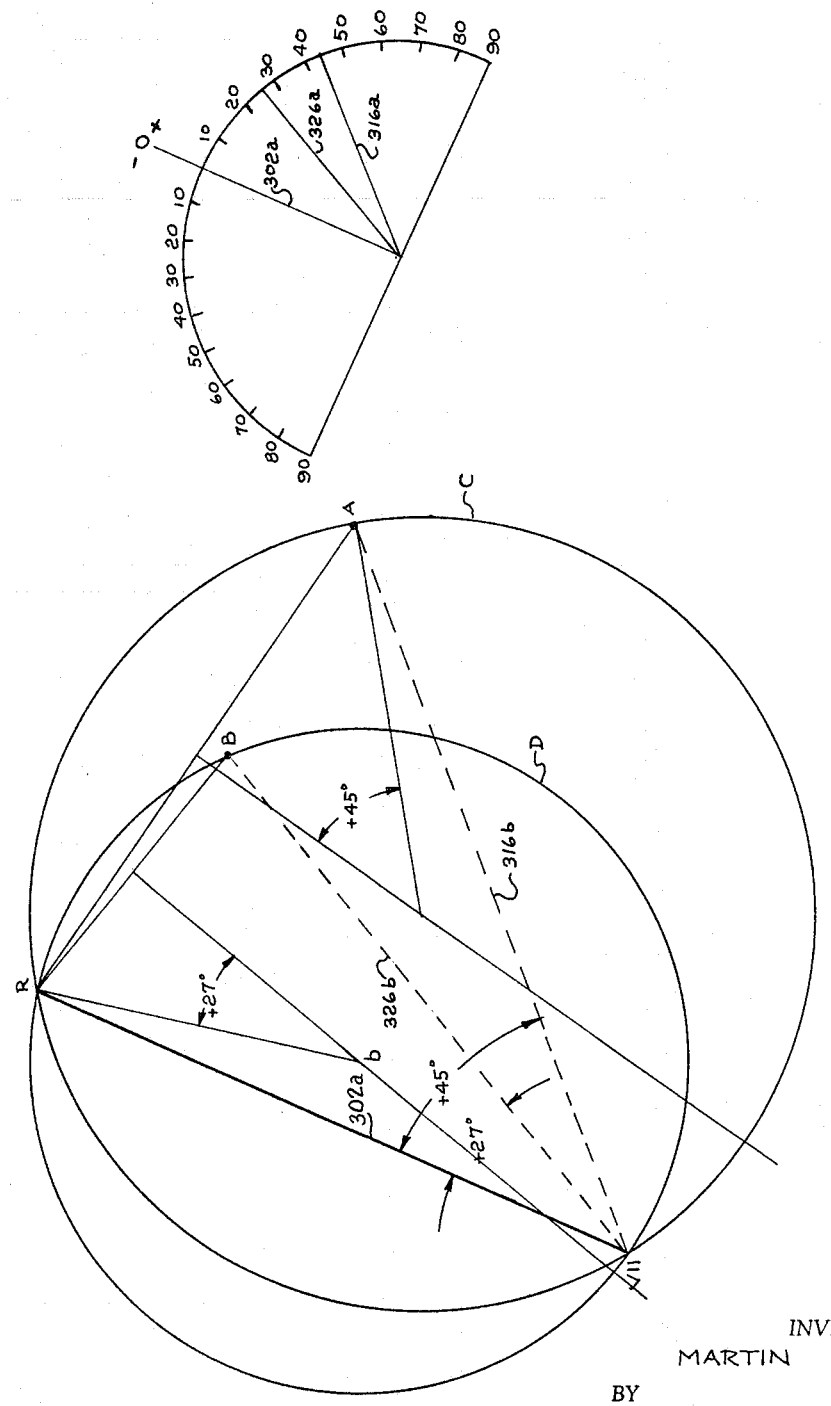

In FIG. 11 an angle-circle construction is shown for an example "fix" obtained when both stations A and B are on the same side with respect to reference station R. For the construction shown, it is assumed that bearing detector and translator unit 18 has determined that station A is 45 positive degrees from station R and station B is 27 positive degrees from station R, positive angles arbitrarily being those formed between reference station R and another station to the right thereof. It will be seen that point V11 at the intersection of circles C and D is the position of the vessel with respect to stations A, R and B. Circles C and D each represent a 45 degree and a 27 degree angle-circle in circle data bank A and circle data bank B, respectively.

Since all possible angles may be represented in only two quadrants of translator wafer 302, then when angles α and β are greater than 90 degrees the angle formed between the reference line 302a and the lines formed by the disposition of arms 316 and 326 nevertheless represents the proper angle-circle to be displayed. This can be better understood when it is considered that even though the antenna may be nulling on a station which is greater than 90 degrees from reference station R, yet arm 316 or 326, as the case may be, inasmuch as it is pivoted about its intermediate position and has a contact on each end thereof, will therefore have a wiping point positioned somewhere within the peripheral disposition of contacts 304 of wafer 302.

Figure 12:
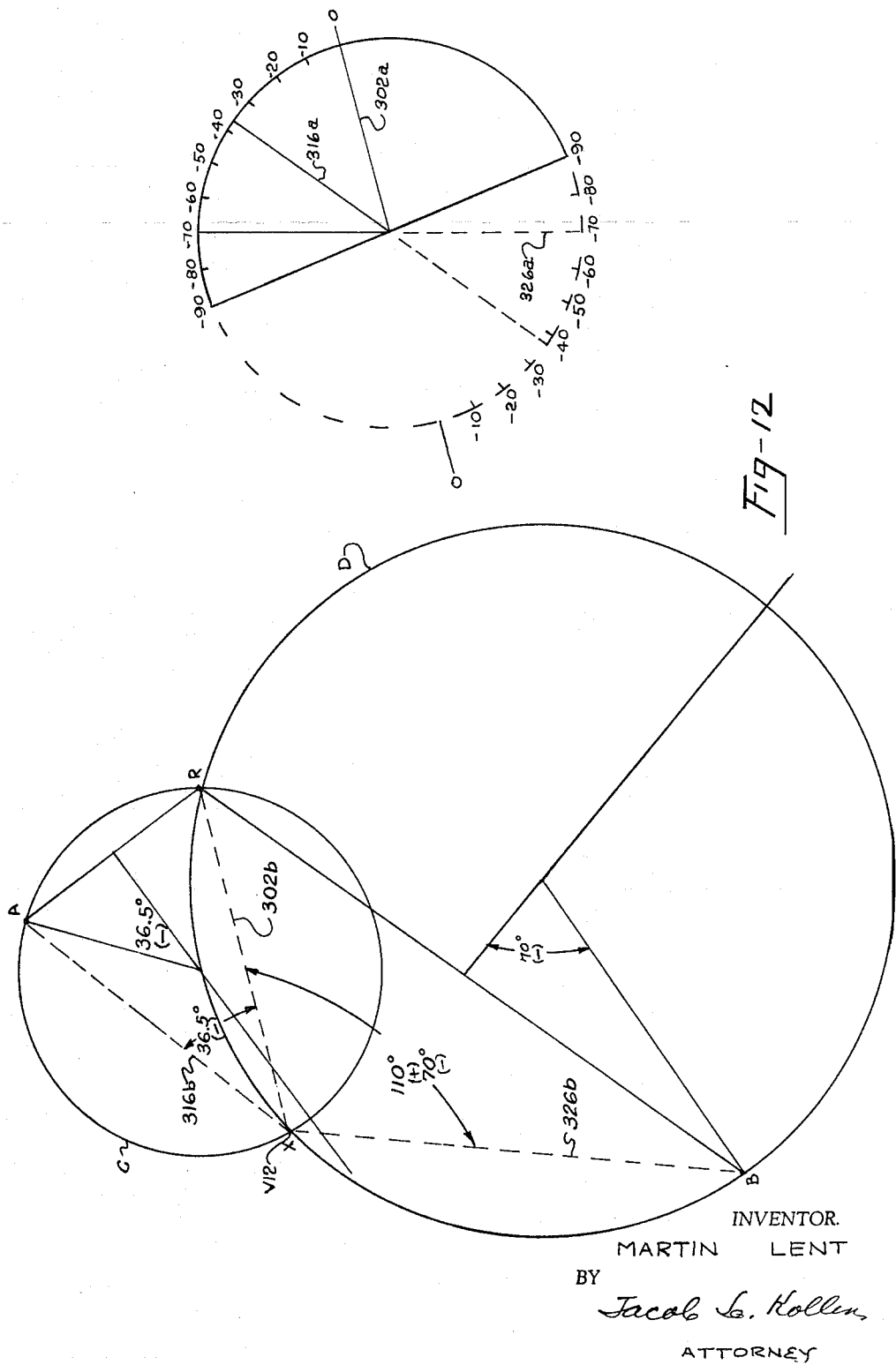

This is illustrated in FIG. 12 where angle-circle constructions are shown for stations A and B which are respectively minus 36½ degrees from reference station R and plus 110 degrees. Thus, although station B is to the rear of the actual position of the vessel as shown by point V12, the proper circle chosen by bearing detector and translator unit 18 from circle data bang CDBB is the circle representative of a minus 70 degree angle or the negative supplement of the 110 degree position of station B with respect to reference station R. Thus, as the vessel goes beyond 90 degrees, in this case, the other end of arm 326 begins to engage the minus 90 degree contact of contact wafer 302. In this manner, either wiper 328 or 330 of arm 326 makes contact with one of contacts 304. It will continue to connect with the contacts 304 until the minus 70 degree contact is reached, and a minus 70 degree circle is selected from circle data bank B.

Referring to FIG. 12, it may be seen that regardless of whether line 302a of the contact wafer is pointing toward or away from the reference startion R, the proper angular differences will be represented by arms 316a and 326a. Since the circular representations of these angular differences are the only necessary information for a positional display, it follows that the possibility of 180 degrees ambiguity problems encountered in systems utilizing linear coordinates for positional indication is eliminated.

Also, the problem of ambiguity does not exist for obtuse angle bearings since for positive obtuse angles, a negative circle representative of the negative supplement of the angle will always be selected and conversely for negative obtuse angle a positive circle less than 90 degrees will always be selected.

Position indicator

In order to properly indicate the instant position of the vessel after the bearings of stations A, B, and R have been detected and translated into angle-circles, the selected circles should be associated with a chart of the area in which the vessel is cruising. An embodiment of a suitable indicator for performing this function is shown in FIGS. 13–16. In this embodiment circle data banks CDBA and CDBB, are each formed into an electroluminescent arrangement 401 with each circle of each data bank being a discrete electrode of an electroluminescent stack or sandwich as shown in FIG. 13. Each circle is insulated from the other circles and is connected by means of leads 400 to a cable 402. Discontinuity between the circles may be provided at points A and R by slightly breaking the circuits at these points so that each circle maybe energized separately. If desired, each circle may also be formed upon a separate sheet of thin transparent material and formed from an electroluminescent substance with a connection from A.C. supply 404 (FIG. 4) being provided to the backing member electrode of electroluminescent arrangement 401.

In the embodiment shown, the illuminated circles are projected through a projector 406 on to a map 408, as shown in FIG. 14. It is necessary that each circle data bank be adjustable in a vertical and horizontal direction and also rotatable at least 180 degrees in order that each circle data bank may be oriented onto the selected chart. Thus, as shown in FIG. 14, circle data bank 401 is mounted for vertical, horizontal and rotational movement in frame 409. There is provided a rack 410 and associated pinion gear 412 for horizontal movement, a rack 414 and a pinion 416 for vertical movement, and a circular rack 418 and a pinion gear 420 for rotational movement of the illuminable circle data bank 401. Control cable such as Bowden cable is attached to gears 412, 416 and 420 for manual adjustment thereof. These cables are respectively designated as 422, 424, 426.

Projector 406 has an adjustable magnification lens 428 which is manually adjustable by means of a control cable 430. Lens 428 is of the "zoom" lens type so that varying degrees of magnification of the projected circle data bank is provided.

Each circle data bank has a corresponding projector and horizontal, vertical and rotary motion adjusting devices of the type described, so that each circle data bank may be adjustably positioned independent of one another and projected upon map 408, as shown in FIG. 15. The projectors for each circle data bank are designated therein as 406a and 406b. Map 408 is preferably formed upon a translucent backing material so that the illuminated circles may appear thereon, as shown in FIG. 16. In order to provide flexibility of the indicator unit, a selection of charts to be used for a season's cruising may be stored upon rollers 432, 434 (FIG. 15) and manually selected by rotating crank 436. FIG. 16, which is attached to a shaft 438, which in turn is connected to a roller shaft 440 by means of belt 442.

The circle data banks CDBA and CDBB, projectors 406a and 406b, and charts 408, may be contained within a suitable housing 444, as shown in FIGS. 1 and 16. The control shafts 422, 424, 426 for controlling the vertical, horizontal and rotational movement of each circle data bank may be brought out to the face of housing 444 and terminated in respective knobs 446a, 446b, 448a, 448b, 450a, 450b. The magnification adjustment cables 430 may likewise be brought to the front of housing 444 and terminated in knobs 430a and 430b respectively. If desired, housing 444 may have a hinge 452 in order to drop the glass front thereof to facilitate chart changing.

Referring again to FIG. 4, each circle data bank CDBA, CDBB, is connected through cables 402a and 402b and cables 310a and 310b to contacts 304 and 306 of wafer 302. Each circle of each data bank has a separate connection to its corresponding contact on wafer 302. The contacts and cable connections are arranged in a manner such that for each degree represented by a contact, a corresponding angle-circle will be energized. The A.C. power supply 404 of suitable voltage and frequency for providing power to the electroluminescent circle data banks. has a terminal connected through contacts K7c to the common electrode of circle data banks CDBA and CDBB. The other terminal of A.C. supply 404 is connected to ground. Likewise, arms 316 and 326 are also connected to ground so that the circuit between power supply 404 and the circle data banks is completed when arms 316 and 326 are brought to rest upon a selected contact.

It will be remembered that during the scanning and nulling operation, relay K7 is in a latched position so that contacts K7c are open, thus deenergizing both circle data banks. However, as soon as contacts K4a are closed, a circuit is completed from power supply 200 to automatic station selector motor M1. As soon as the drive shaft 26 completes its counter-clockwise rotation to close switch S5b, latch relay K7 is unlatched by energization of coil K7u, thereby among other things, closing contacts K7c to apply power to the circles selected by the position of arms 316 and 326 with respect to the contacts of wafer 302. If proper orientation of the circle data banks upon associated chart 408 with respect to the location of stations A, B and R has been achieved, then the point of intersection between the two selected circles will indicate to the operator the exact position of the vessel. The operator should then turn switch S1 to its Off position whereby the circles will remain illuminated upon chart 404 but all further scanning will cease, unless the operator wishes the complete cycle to be again performed and a new "fix" taken.

When a new area is about to be entered by the vessel for the first time, it is necessary that for the selected chart of the area, the circle data banks be properly positioned with respect to stations A. B and R. Accordingly, a switch 454, FIG. 4, is connected between a selected terminal from each of terminal sets 304 and 306 of contact wafer 302 and ground. When switch 454 is closed, the circle associated with the selected contacts will be illuminated. As the points A and R, and B and R of each circle data bank CDBA and CDBB will be clearly apparent from the illuminated circles, the control knobs H, V, R and M of indicator 22 are adjusted until the points A and R for circle data banks CDBA are aligned on the chart with the actual known position of the selected transmitting stations A and R. Likewise, for circle data banks CDBB, the manual controls are adjusted until the points on the illuminated circle from CDBB are in alignment with the known positions of transmitting stations R and B on map 404. Henceforth, the circle data banks will be aligned and will automatically indicate the exact position of the vessel as long as the selected area chart is used.

It is obvious that the position indicator 22 may be modified in a number of ways if desired, without departing from the principles of the invention. For example, a single projector may be used, with circle data banks CDBA, and CDBB being mounted for selective forward and backward motion with respect to the projector, in order to eliminate both a second projector and the need for a lens with variable magnification. Also, the circles themselves comprising CDBA and CDBB need not be formed from an electroluminescent structure but may be fabricated from other illuminable devices, for example, discrete incandescent or fluorescent tubes formed into the desired circular configurations, and selectively actuated in the manner described.

While the present invention has been disclosed by means of a specific illustrative embodiment thereof, it would be obvious to those skilled in the art that numerous other arrangements and modifications may be made without departing from the spirit of the invention as defined in the appended claims. For example, it is obvious that the novel signal direction detector circuit shown in FIG. 4 could operate equally as well with an antenna system which detected the position of an unknown signal source by sensing the maximum signal strength received from the unknown source rather than the minimum or null point thereof. To achieve this modification it is only necessary to reverse the polarity of the AVC current applied to lines 22, 226 and provide a suitable maximum signal peaking type of antenna.

I claim:

1. Apparatus for providing an indication of the instant position of a movable vehicle comprising, means for determining the directional bearings between each of a plurality of known fixed positions and the instant position of a movable vehicle, means for determining and temporarily storing the angular dispersions between selected ones of said directional bearings, means for reading out said angular dispersions from said storage means and translating said determined angular dispersions into selected visual representations thereof, indicating means for visually indicating said instant position including a pictorial representation of said known fixed positions, and means for associating said selected visual representations of said angular dispersions with said known fixed positions on said pictorial representation in a manner such that a common point of intersection of said visual representations indicates visually said instant position.

2. Apparatus for providing an indication of the instant position of a movable vehicle with respect to a plurality of known fixed positions comprising, means for establishing a reference direction between said instant position and one of said fixed positions, means for establishing other directions between said instant position and each of said other known fixed positions, means for determining the angular dispersions between said reference direction and each of said other directions, means for temporarily storing said angular dispersions, means for reading out said angular dispersions from said storage means and for translating said angular dispersions into indicia representative of said angular differences, indicating means for visually indicating said instant position including a pictorial representation of said known fixed positions, and means for associating said indicia with said known fixed positions on said pictorial representation in a manner such that a common point of intersection of said indicia indicates visually said instant position.

3. Apparatus for providing an indication of the instant position of a movable vehicle comprising, directional signal detecting means for detecting the directional bearings between each of a plurality of sources of radio signals having known fixed positions and the instant position of a movable vehicle, said signal detecting means including receiving means having directional antenna means and means for nulling said antenna means on each of said signal sources, means for determining and temporarily storing the angular dispersions between selected directional bearings indicated by each null, means for reading out said angular dispersions from said storage means and translating said detected angular dispersions into selected visual representations thereof, indicating means to visually indicate said instant position including pictorial representations of said fixed positions of said signal sources, and means for associating said selected representations with said known fixed positions on said pictorial representations to indicate visually said instant position.

4. Apparatus for providing an indication of the instant position of a movable vehicle comprising, means for determining the directional bearings between each of a plurality of known fixed positions and the instant position of a movable vehicle, means for determining the angular dispersions between selected directional bearings and translating said angular dispersions into selected circular representations thereof, indicating means for visually indicating said instant position including a pictorial representation of the geographic relationship of said known fixed positions, and means for associating said selected circular representations with said known fixed positions on said pictorial representation in a manner such that a common point of intersection of said circular representations indicates visually said instant position.

5. The invention defined in claim 4, wherein said indicating means includes means for illuminating each selected circular representation.

6. The invention defined in claim 5 including means to project said illuminated circular representation on to said pictorial representation.

7. The invention defined in claim 4 wherein each of said selected circular representations is adapted to be selectively illuminated and wherein said means for associating said selected circular representation with said known fixed positions includes movable means mounting said illuminated representations for projection onto said pictorial representation, projecting means disposed adjacent said mounting means for projecting said selectively illuminated circular representations onto said pictorial representation and articulating means for moving said mounting means to effect alignment of said circular representations with said known fixed positions.

8. The method of indicating the instant position of a movable vehicle comprising the steps of determining the directional bearings between each of a plurality of known fixed positions with respect to the instant position of a movable vehicle whose position is to be indicated, determining the angular dispersions between selected directional bearings and translating said determined angular dispersions into selected circular representations thereof, and relating the selected circular representations with known fixed positions on a pictorial representation of the geographic relationship of said fixed positions so that a common point of intersection of the circular representations is indicative of the instant position of a movable vehicle on said pictorial representation.

9. Apparatus for providing an indication of the instant position of a movable vehicle comprising, directional signal detecting means for detecting the directional bearings between each of a plurality of sources of radio signals having known fixed positions and the instant position of a movable vehicle, means for determining the angular dispersions between selected directional bearings, and translating said detected angular dispersions into selected circular representations thereof, indicating means for visually indicating said instant position including a pictorial representation of the geographical relationship of said fixed positions of said signal sources, and means for associating said selected circular representations with said known fixed positions on said pictorial representations in a manner such that a common point of intersection of said circular representation indicates visually said instant position.

10. Apparatus for providing an indication of the instant position of a movable vehicle comprising, directional signal detecting means for detecting the directional bearings between each of a plurality of sources of radio signals having known fixed positions and the instant position of a movable vehicle, said signal detecting means including radio signal receiving means having means for pre-setting the tuning frequencies of each of said known signal sources, said receiving means having automatic signal source scanning means for automatically selecting each of said frequencies in sequence, means for determining the angular dispersions between selected directional bearings and translating said detected angular dispersions into selected circular representations thereof, indicating means for visually indicating said instant position including a pictorial representation of the geographical relationship of said fixed positions of said signal sources, and means for associating said selected circular representations with said known fixed positions on said pictorial representations in a manner such that a common point of intersection of said circular representation indicates visually said instant position.

11. The invention defined in claim 10 wherein said directional bearing detecting means includes means for temporarily storing said detected directional bearings, and further includes means for incapacitating said signal source selecting means after the frequency of the signal from one of said sources has been selected and until the directional bearing of the fixed source represented by said signal has been detected and stored.

12. Apparatus for providing an indication of the instant position of a movable vehicle comprising, automatic signal selecting means for sequentially selecting radio signals representative of a plurality of sources having known fixed positions with respect to the instant position of the movable vehicle, means responsive to the sequenial selection of each of said signals for determining the directional bearings between each of said known positions of said signal sources and the instant position of said movable vehicle, means for determining the angular dispersions between selected directional bearings and translating said angular dispersions into selected circular representations thereof, indicating means for visually indicating said instant position including a pictorial representation of the geographical relationship of said fixed positions of said signal sources, and means for associating said selected circular representations with said known fixed positions on said pictorial representations in a manner such that a common point of intersection of said circular representation indicates visually said instant position.

13. Apparatus for providing an indication of the instant position of a movable vehicle comprising, directional signal detecting means for detecting the directional bearings between each of a plurality of sources of radio signals having known fixed positions and the instant position of a movable vehicle, said signal detecting means including radio signal receiving means having means for pre-setting the tuning frequencies of each of said known signal sources, said receiving means having automatic signal source scanning means for automatically selecting each of said frequencies in sequence, said directional signal detecting means further including directional antenna means and automatic means for causing said antenna means to detect the directional bearing of each of said sources of signals with respect to said instant position of said movable vehicle and including means for preventing said signal selecting means from selecting a subsequent signal until said antenna has detected the direction of a previously selected signal source, means for determining the angular dispersions between selected directional bearings and translating said detected angular dispersions into selected circular representations thereof, indicating means for visually indicating said instant position including a pictorial representation of the geographical relationship of said fixed positions of said signal sources, and means for associating said selected circular representations with said known fixed positions on said pictorial representations in a manner such that a common point of intersection of said circular representation indicates visually said instant position.

14. Apparatus for providing an indication of the instant position of a movable vehicle comprising, means for determining the directional bearings between each of a plurality of known fixed positions and the instant position of a movable vehicle, means for determining and temporarily storing information representative of the angular dispersions between selected ones of said determined directional bearings, means connected to said temporary storage means for reading out said angular dispersions information and translating said information into selected circular representations thereof, indicating means for visually indicating said instant position including a pictorial representation of the geographic relationship of said known fixed positions, and means for associating said selected circular representations with said known fixed positions on said pictorial representation in a manner such that a common point of intersection of said circular representations indicates visually said instant position.

15. Apparatus for providing an indication of the instant position of a movable vehicle with respect to a plurality of known fixed positions comprising, means for establishing a reference bearing between said instant position and one of said fixed positions, means for establishing other bearings between said instant position and said other known fixed positions, means for determining the angular dispersions between said reference bearing and each of said other bearings, means for translating said angular dispersions into circular representations thereof, indicating means for visually indicating said instant position including a pictorial representation of the geographic relationship of said known fixed positions, and means for associating said selected circular representations with said known fixed positions on said pictorial representation in a manner such that a common point of intersection of said circular representations indicates visually said instant position.

16. Apparatus for providing an indication of the instant position of a movable vehicle with respect to a plurality of known fixed positions comprising, radio signal receiving means for receiving radio signals from each of said known fixed positions, said radio signal receiving means having means for pre-setting the tuning frequencies of each of said signals from said known positions and including automatic signal source scanning means for automatically selecting each of said frequencies in sequence, signal detecting means connected to said receiving means for detecting the directional bearings between the signals from said known fixed positions and the instant position of the movable vehicle, means for temporarily storing said detected directional bearings including means for determining the angular dispersion between selected ones of said stored directional bearings, means for temporarily incapacitating said signal source selecting means after the frequency of the signal from each of said known positions has been selected and until the directional bearing of the fixed position represented by said signal has been detected and stored, means for temporarily deactivating said storage means to prevent said storage means from receiving further bearing information each time after said directional bearing information has been read into said storage means, means for disabling said receiver incapacitating means to allow the frequency of another station to be selected by said signal source selecting means after each said directional bearing has been detected and stored, means connected to said temporary storage means for reading out said angular dispersions and translating said dispersion into selected circular representations of said stored angular bearings, indicating means for visually indicating said instant position including a pictorial representation of the geographic relationship of said known fixed positions, and means for associating said selected circular representations with said known fixed positions on said pictorial representation in a manner such that a common point of intersection of said circular representations indicates visually said instant position.

17. Apparatus for providing an indication of the instant position of a movable vehicle comprising, directional signal detecting means for detecting the angular bearings between each of a plurality of sources of radio signals having known fixed positions and the instant position of a movable vehicle, said signal detecting means including radio signal receiving means having means for pre-setting the tuning frequencies of each of said known signal sources, said receiving means having automatic signal source scanning means for automatically selecting each of said frequencies in sequence, means for translating said detected angular bearings into selected visual representations thereof, indicating means for visually indicating said instant position including a pictorial representation of said known fixed positions, and means for associating said selected visual representations of said angular bearings with said known fixed positions on said pictorial representation in a manner such that a common point of intersection of said visual representations indicates visually said instant position.

18. Apparatus for providing an indication of the instant position of a movable vehicle comprising, means for determining the directional bearings between each of a plurality of known fixed positions and the instant position of a movable vehicle, means for determining the angular dispersions between selected directional bearings, a plurality of circles of selected diameters, each circle being representative of a selected angular dispersion, means connected to said angular dispersion determining means for selecting a circle representative of each angular dispersion, indicating means for visually indicating said instant position including a pictorial representation of said known fixed positions, and means for associating said selected circles with said known fixed positions on said pictorial representation of said circular representations indicates visually said instant position.

19. The invention defined in claim 18 wherein said circle selecting means includes means for selecting circles corresponding to the supplements of said angular dispersions when said angles are obtuse.

20. The invention defined in claim 18 wherein said circles have a common chord of selected length.

21. The invention defined in claim 20 wherein said circles are segregated into positive and negative groups about said common chord, said chord dividing said circles into larger and smaller areas, said groups having circles of corresponding diameters, the larger areas of one group of circles lying on one side of said chord to define a positive group and the larger areas of the other group of circles lying on the other side of said chord to define the negative group.

22. Apparatus for providing an indication of the instant position of a movable vehicle comprising, means for determining the directional bearings between each of a plurality of known fixed positions and the instant position of a movable vehicle, one of said fixed positions being designated as a reference position, means for determining the angular dispersions between selected directional bearings, a plurality of circles of selected diameters, each circle being representative of a selected bearing angle, said circles being grouped into selected sets with the circles of each set having a common chord of selected length, means connected to said angular dispersion determining means for selecting a circle from each set representative of each angular dispersion, indicating means for visually indicating said instant position including a pictorial representation of said known fixed positions, and means for associating said selected circles with said known fixed positions on said pictorial representation comprising means for aligning one end of each chord of each circle with the indicated location of said known reference position to form a common alignment point, and the other end of said chord of each set with the diverse locations of said fixed positions, whereby the common point of intersection of said circles other than said common alignment point, indicates visually said instant position.

23. Apparatus for providing an indication of the instant position of a movable vehicle with respect to a plurality of known fixed positions comprising, means for establishing a reference bearing between said instant position and one of said fixed positions, means for establishing other bearings between said instant position and said other known fixed positions, means for determining the angular dispersions between said reference bearing and each of said other bearings, a plurality of circles of selected diameters, each circle being representative of a selected angular dispersion, said circles being grouped into selected sets with the circles of each set having a common chord of selected length, means connected to said angular dispersion determining means for selecting a circle from each set representative of each angular dispersion, indicating means for visually indicating said instant position including a pictorial representation of said known fixed positions, and means for associating said selected circles with said known fixed positions on said pictorial representation comprising means for aligning one end of each chord of each circle with the indicated location of said known reference position to form a common alignment point and the other end of each chord of each set respectively with one of said locations of said fixed positions, whereby the common point of intersection of said circles other than said common alignment point, indicates visually said instant position.

24. The invention defined in claim 23 wherein each circle of each set has a center point lying along the perpendicular bisector of said common chord and a radius forming an angle with said bisector equal to said selected angular dispersion for said circle when extended between said center point and one end of said chord.

25. The invention defined in claim 23 wherein said angular dispersion determining means is operative to translate said detected angular dispersions into angular dispersion no greater than 90° with said reference bearing being designated as 0° and said angular dispersions lying on one side of said reference bearing being designated as positive angular dispersions and said angular dispersions lying on the other side of said reference bearing being designated as negative angular dispersions, said circles being segregated into positive and negative groups about said common chord with the circles of each group extending in diametrically opposite directions, said circles representing a corresponding positive or negative angular dispersion.

26. In apparatus for providing an indication of the instant position of a movable vehicle with respect to a plurality of known fixed positions, the combination comprising, directional signal detecting means for detecting the directional bearings between each of a plurality of sources of radio signals having known fixed positions and the instant position of a movable vehicle, radio signal receiving means coupled to said directional signal detecting means and having tuning means for detecting the relative frequencies of selected one of said radio signals occurring in a selected frequency band, means coupled to said tuning means for memorizing the tuning positions representative of the relative frequencies of a selected number of detected signals, means for reading into said memory means the tuning positions of said selected frequencies, scanning means for causing said tuning means to scan said selected band of frequencies, and means coupled to said memory means one of said directional signal detecting means for (1) stopping said scanning means each time one of said memorized tuning positions has been reached until the directional bearing of the signal associated therewith has been detected and (2) restarting said scanning means after the bearing of said selected signal has been detected.

27. The invention defined in claim 26 wherein said scanning means includes reversing means for reversing the direction of said frequency band scanning whenever an end of said band is reached.

28. The invention defined in claim 27 including means connected to said stopping means and operative to incapacitate said stopping means whenever said band is scanned in a selected direction.

29. In apparatus for providing an indication of the instant position of a movable vehicle with respect to a plurality of known fixed positions, the combination comprising, directional signal detecting means for detecting the directional bearings between each of a plurality of sources of radio signals having known fixed positions and the instant position of a movable vehicle, radio signal receiving means coupled to said directional signal detecting means and having tuning means for detecting the relative frequencies of selected one of said radio signals occurring in selected frequency bands, means coupled to said tuning means for memorizing the tuning positions representative of the relative frequencies of a selected number of detected signals, band shifting means associated with said tuning position memorizing means for selecting the frequency band of each of said selected signals, means for reading into said memorizing means the tuning positions and frequency bands of said selected frequencies, scanning means for causing said tuning means to scan each selected band of frequencies, and means coupled to said memory means and said directional signal detecting means and operative each time one of said memorized tuning positions has been reached for stopping said scanning means and actuating said band shifting means to select the memorized band associated with said memorized tuning position, until the directional bearing of said memorized signal has been detected, and means for restarting said scanning means to search for another memorized tuning position after said first memorized signal bearing has been detected.

30. In apparatus for providing an indication of the instant position of a movable vehicle with respect to a plurality of known fixed positions, the combination comprising, directional signal detecting means for detecting the directional bearings between each of a plurality of sources of radio signals having known fixed positions and the instant position of a movable vehicle, radio signal receiving means coupled to said directional signal detecting means and having rotary tuning means for detecting relative frequencies of selected ones of said radio signals occurring in a selected frequency band, a shaft coupled to said tuning means and adapted to rotate in synchronism therewith, at least one drum axially mounted on said shaft, and having a plurality of pin receiving bores disposed near the outer periphery thereof and in axial alignment therewith, a plurality of pins slidably mounted in said bore, each pin being representative of the tuning position of a selected signal, means for sliding selected ones of said pins outwardly into a set position to memorize the tuning position of selected signals, switches mounted adjacent the path of travel of said outwardly extending pins and adapted to be actuated thereby, a drive motor for driving said shaft in synchronism with said tuning means, circuitry connected to said switches for stopping said driving motor each time one of said switches is actuated, and circuit means coupled to said directional signal detecting means and operative in response to the completion of the direction determination of a selected signal to override said motor stopping circuitry and allow said motor to rotate said shaft until the next switch is actuated.

31. The invention defined in claim 30 wherein said pins have stop means on one end to limit the axial travel thereof through said bores, and including a pin resetting disc mounted on said shaft and interposed between an end of said drum and said stop means of said pins, said resetting disc having bores in register with the bores in said drum with said pins adapted to pass through the bores in both said disc and said drum, and means connected to said disc and operative to move said disc axially along said shaft to engage said pin stop means to withdraw each set pin away from a switch actuating position and into a reset position.

32. The invention defined in claim 31 wherein said shaft has an axial bore and said disc moving means includes an actuating rod coaxially disposed in the bore of said shaft and linkage means connected to said shaft and said reset disc and operative upon axial movement of said rod to move said reset disc and cause said pins to shift from a set to a reset position.

33. Apparatus for providing an indication of the instant position of a movable vehicle comprising, directional signal detecting means for detecting the bearings between each of a plurality of sources of radio signals having known fixed positions and the instant position of a movable vehicle, said signal detecting means including radio signal receiving means having means for presetting the tuning frequencies of each of said known signal sources, said receiving means having automatic signal source scanning means for automatically selecting each of said frequencies in sequence, said directional signal detecting means further including directional antenna means and automatic means for causing said antenna means to detect the direction of each of said sources of signals, and including means for preventing said signal selecting means from selecting a subsequent signal until said antenna means has detected the direction of a previously selected signal source, means connected to said scanning means for limiting said scanning to at least one selected band of frequencies, means operative to recycle said scanning means after the end limits of a selected frequency band are reached in order to repetitively scan said band, means for preventing the commencing of the selection of said sequence of signal frequencies until said scanning means has reached one selected limit of a frequency band and commenced a new scan, and means for translating said detected bearings into selected visual representations thereof for visually indicating said instant position.

34. Apparatus for providing an indication of the instant position of a movable vehicle comprising, directional signal detecting means for detecting the angular bearings between each of a plurality of sources of radio signals having known fixed positions and the instant position of a movable vehicle, said signal detecting means including radio signal receiving means having means for pre-setting the tuning frequencies of each of said known signal sources, scanning means for automatically selecting each of said frequencies in sequence, means for translating said detected angular bearings into selected visual representations thereof, indicating means for visually indicating said instant position including a pictorial representation of said known fixed positions, means for associating said selected visual representations of said angular bearings with said known fixed positions on said pictorial representation in a manner such that a common point of intersection of said visual representations indicates visually said instant position, and means for maintaining said selected visual representations in an activated, visual condition until the commencement of the next selection of a sequence of frequencies.

35. In radio direction finding apparatus, the combination comprising directional antenna means for detecting the direction of selected sources of radio signals, scanning means associated with said antenna means for driving said antenna means in selected directions to search for said selected signal sources, first bearing storage means adapted to temporarily move in synchronism with said scanning means when a first bearing of a first one of said signal sources is being detected, means operative in response to the detection of a first bearing for stopping the movement of said first bearing storage means at a position representative of the direction of said first selected signal source, second bearing storage means adapted to temporarily move in synchronism with said scanning means when a second bearing of a second one of said signal sources is being detected, means operative in response to the detection of a second bearing for stopping the movement of said second bearing storage means at a position representative of the direction of said second selected signal source, and means connected to said first and second bearing storage means for indicating the angular dispersion between the stopped positions of said first and second bearing storage means.

36. Automatic signal seeking apparatus for signal bearing detection apparatus comprising, signal receiving means having tuning means for detecting the relative frequencies of signals from selected known sources, said frequencies occurring in at least one selected frequency band, means coupled to said tuning means for memorizing the tuning positions representative of the relative frequencies of a selected number of detected signals, means for reading into said memory means the tuning positions of said selected frequencies, frequency scanning means for causing said tuning means to scan a selected band of frequencies, means coupled to said memory means for stopping said scanning means each time one of said memorized tuning positions has been reached until the bearing of said signal has been detected, directional antenna means for detecting the direction of said selected sources of radio signals, horizon scanning means associated with said antenna means and operative in response to the stopping of said frequency band scanning means for driving said antenna means in selected directions to search for said selected signal sources, first bearing storage means adapted to temporarily move in synchronism with said scanning means when a first bearing of a first one of said signal sources having a memorized tuning position is being detected, means operative in response to the detection of a first bearing for (1) stopping the movement of said first bearing storage means at a position representative of the direction of said first selected signal source and (2) restarting said frequency scanning means after the bearing of said signal has been detected, second bearing storage means adapted to temporarily move in synchronism with said scanning means when a second bearing of a second one of said signal sources having a memorized tuning position is being detected, means operative in response to the detection of a second bearing for stopping the movement of said second bearing storage means at a position representative of the direction of said second selected signal source, and means connected to said first and second bearing storage means for indicating the angular dispersion between the stopped positions of said first and second bearing storage means.

37. In radio direction finding apparatus, the combination comprising directional antenna means for detecting the angular dispersion between direction bearings of selected sources of radio signals, scanning means associated with said antenna means for driving said antenna means in selected directions to search for said selected signal sources, first bearing storage means adapted to temporarily move in synchronism with said scanning means when a first bearing of a first one of said single sources is being detected, said first bearing storage means including a movable semi-circular member having contacts disposed about the outer periphery and on one side thereof, means operative in response to the detection of a first bearing for stopping the movement of said semi-circular member at a position representative of the direction of said first selected signal source, second bearing storage means adapted to temporarily move in synchronism with said scanning means when a second bearing of a second one of said signal sources is being detected, said second bearing storage means including a wiping arm movable in synchronism with said scanning means and operative to successively wipe said contacts on said semi-circular member, means operative in response to the detection of a second bearing for stopping the movement of said wiping arm at a position representative of the direction of said second selected signal source, means for indicating the angular dispersion between the stopped positions of said first and second bearing storage means, and means connected to said wiping arm and to each of said contacts of said semi-circular member and operative to selectively actuate said indicating means to indicate an angular dispersion corresponding to a stopped position of said first and second bearing storage means.

38. The invention defined in claim 37 wherein said angular dispersion indicating means includes selectively illuminable indicia representations of said angular dispersions, each of said indicia beng connected in series with a corresponding one of said contacts and said wiping arms and adapted to be selectively actuated by said actuating means for said indicating means.

39. The invention defined in claim 37 wherein said wiping arm is pivoted at a point intermediate the ends thereof and has electrically interconnected wipers disposed on each end for engaging said contacts, to limit said indicated angular dispersion to no greater than 180°.

40. The invention defined in claim 37 including means for aligning the center contact of said semi-circular member with said detected direction of said first signal source when said first bearing storage means is stopped, so that all indicated angular dispersions are referenced to one side or the other of said center contact.

41. The invention defined in claim 40 wherein said wiping arm is pivoted at a point intermediate the ends thereof and has electrically interconnected wipers disposed on each end for engaging said contacts, whereby said angular dispersions are referenced to one side or the other of said center contact to limit said indicated angular dispersions to no greater than 90°.

42. The invention defined in claim 37 wherein said first bearing storage means includes a shaft driven in synchronism with said scanning means, said shaft having at least one axial slot positioned to correspond to the position of maximum directional sensitivity of said antenna means, said movable semi-circular member and said wiping arm each having a respective selectively movable finger operative when actuated to engage said slot and lock said member and said wiping arm to said shaft and be driven thereby, and further includes means operative in response to the commencement of the detection of a first bearing to actuate a first one of said movable fingers, and means operative in response to the commencement of the detection of a second bearing to actuate a second one of said movable fingers, said first and second fingers being de-actuated when said first and second bearings have been detected.

43. The invention defined in claim 42 including means associated with each movable finger for preventing each of said associated bearings from being detected until said corresponding fingers have engaged said slot.

44. The invention defined in claim 42 wherein said directional antenna means has an output signal corresponding to a detected position of a selected signal source, and including signal receiving means for translating said antenna output signals into corresponding signals for operating said first and second movable finger actuating means, said signal receiving means having means to selectively deactuate said first and second movable finger actuating means sequentially after said first and second bearings have been detected.

45. In radio direction finding apparatus, a radio signal source direction detector comprising directional antenna means having a position of maximum directional sensitivity and an output signal corresponding thereto, scanning means associated with said antenna means for driving said antenna means in selected directions to search for selected signal sources, signal receiving means connected to said antenna means and having an output signal varying in accordance with variations in said signal output from said antenna means, means for indicating a detected direction of a selected signal source, control circuit means connected to said scanning means for reversing said scanning means, means connected to said control circuit means and operative in response to a change in signal output from said receiving means in a first direction beyond a first predetermined level to cause said control circuit to reverse said scanning means, and means operative in response to a change in signal output from said receiving means in a second direction beyond a second predetermined level corresponding to the signal output from said antenna means when the said position of maximum directional sensitivity has been reached to actuate said direction indicating means.

46. The invention defined in claim 45 wherein said signal receiving means includes tuning means for detecting the relative frequencies of selected signals occurring in at lease one selected frequency band coupled to said tuning means for memorizing the tuning positions representative of the relative frequencies of a selected number of detected signals, means for reading into said memory means the tuning positions of said selected frequencies, scanning means for causing said tuning means to scan a selected band of frequencies, means coupled to said memory means for stopping said scanning means each time one of said memorized tuning positions as been reached until the bearing of said signal has been detected, and means operative in response to the detection of a selected bearing to restart said scanning means for said tuning means.

47. The invention defined in claim 45 including extreme limit means connected to said control circuit means for said scanning means and operative to override said first reversing means for said scanning means and arbitrarily reverse said scanning means when said antenna means has scanned beyond a predetermined limit.

48. The invention defined in claim 45 wherein said means for actuating said direction indicating means has an adjustable signal threshold level and includes means operative to adjust said threshold level towards said second predetermined level each time said antenna is reversed.

49. The invention defined in claim 48 including means operable to reset said threshold level away from said second predetermined level after said scanning means have been deenergized a predetermined length of time.

50. In radio direction finding apparatus, a radio signal source direction detector comprising a directional antenna having a position of maximum directional sensitivity and an output signal corresponding thereto, scanning means associated with said antenna means for driving said antenna means in selected directions to search for selected signal sources, signal receiving means connected to said antenna means and having an output signal varying in accordance with variations in said signal output from said antenna means, means for indicating a detected direction of a selected signal source, a control circuit connected to said scanning means for reversing said scanning means, a relay having a pair of adjustable contacts and an actuating coil, said actuating coil being connected to said signal output of said receiver, first circuit means connecting a first one of said adjustable contacts to said control circuit, said first contacts being operative in response to a first selected value of said output signal applied to said actuating coil to cause said control circuit to reverse said scanning means, second circuit means connecting a second one of said adjustable contacts to said control circuit, said second contacts being operative in response to a second selected value of said output signal applied to said actuating coil to actuate said direction indicating means, said second one of said adjustable contacts being initially adjusted at the commencement of a selected scanning cycle to fail to close at any output signal value, and means operative each time said scanning means is reversed for incrementally advancing the adjustment of said second contacts towards closure when said second signal value is applied to said coil.

References Cited by the Examiner
UNITED STATES PATENTS

| | | |
|---|---|---|
| 2,138,966 | 12/1938 | Hafner. |
| 2,422,100 | 6/1947 | Huff _____ 343—112 |
| 2,637,848 | 5/1953 | Cunningham _____ 343—112 |
| 2,969,539 | 1/1961 | Miner _____ 343—112 |
| 3,015,098 | 12/1961 | Jolliffe et al. _____ 343—112 |

OTHER REFERENCES

Smyth, "Microwave Position Fixing System," Journal of Geophysical Research, vol. 65, No. 2, February 1960, pp. 490–498.

CHESTER L. JUSTUS, *Primary Examiner.*

LEWIS H. MYERS, *Examiner.*

R. E. BERGER, *Assistant Examiner.*